US012584792B2

(12) United States Patent
Dougakiuchi

(10) Patent No.: US 12,584,792 B2
(45) Date of Patent: Mar. 24, 2026

(54) LIGHT MEASURING DEVICE AND METHOD OF MANUFACTURING LIGHT MEASURING DEVICE

(71) Applicant: HAMAMATSU PHOTONICS K.K., Hamamatsu (JP)

(72) Inventor: Tatsuo Dougakiuchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 236 days.

(21) Appl. No.: 18/237,594

(22) Filed: Aug. 24, 2023

(65) Prior Publication Data

US 2024/0068866 A1 Feb. 29, 2024

(30) Foreign Application Priority Data

Aug. 29, 2022 (JP) ................................. 2022-135666
May 31, 2023 (JP) ................................. 2023-089901
Jul. 20, 2023 (JP) ................................. 2023-118229

(51) Int. Cl.
    *G01J 3/02* (2006.01)
    *G01J 3/427* (2006.01)
    *G01J 3/42* (2006.01)

(52) U.S. Cl.
    CPC ............. *G01J 3/021* (2013.01); *G01J 3/0208* (2013.01); *G01J 3/0289* (2013.01); *G01J 3/427* (2013.01);
    (Continued)

(58) Field of Classification Search
    CPC ......... G01N 21/031; G01N 2201/0636; G02B 26/0816; G02B 17/004; G02B 17/006
    See application file for complete search history.

(56) References Cited

U.S. PATENT DOCUMENTS 5,841,801 A * 11/1998 Suzuki ................ H01S 3/09415
                                                    372/71
2006/0193362 A1* 8/2006 Kopf ................... H01S 3/08081
                                                    372/98
(Continued)

OTHER PUBLICATIONS

Dougakiuchi, T. and Akikusa, N., 2021. Application of high-speed quantum cascade detectors for mid-infrared, broadband, high-resolution spectroscopy. Sensors, 21(17), p. 5706. (Year: 2021).*
(Continued)

*Primary Examiner* — Dominic J Bologna
*Assistant Examiner* — Mohamed Doumbia
(74) *Attorney, Agent, or Firm* — Faegre Drinker Biddle & Reath LLP

(57) ABSTRACT

The spectrometer includes: a light source unit emitting a laser beam; a mirror unit including a first plane mirror having a first mirror surface and a second plane mirror having a second mirror surface, wherein a measurement target is introduced between the first mirror surface and the second mirror surface; and a light detector detecting the laser beam returned by multiple reflection between the first mirror surface and the second mirror surface. The first mirror surface and the second mirror surface are arranged non-parallel to each other when viewed from the Z-axis direction so as to form an optical path of the laser beam reciprocating in the Y-axis direction while performing multiple reflection between the first mirror surface and the second mirror surface. The optical path of the laser beam between the first mirror surface and the second mirror surface is inclined with respect to the Z-axis direction.

21 Claims, 19 Drawing Sheets

(52) U.S. Cl.
    CPC . *G01J 2003/423* (2013.01); *G01J 2003/4275*
    (2013.01)

(56) References Cited

U.S. PATENT DOCUMENTS

2020/0029904 A1 *   1/2020   Kim ..................... A61B 5/6801
2022/0260816 A1 *   8/2022   Katsumata ........... G02B 17/004

OTHER PUBLICATIONS

Herriott, Donald R. et al., "Folded Optical Delay Lines," Applied
Optics, vol. 4, Aug. 1, 1965, pp. 883-889.

* cited by examiner

LIGHT MEASURING DEVICE AND METHOD OF MANUFACTURING LIGHT MEASURING DEVICE

TECHNICAL FIELD

The present disclosure relates to a light measuring device and a method of manufacturing a light measuring device.

CROSS-REFERENCE TO RELATED APPLICATION

This application claims the benefit of priorities from Japanese Patent Application No. 2022-135666, filed on Aug. 29, 2022, Japanese Patent Application No. 2023-89901, filed on May 31, 2023, and Japanese Patent Application No. 2023-118229, filed on Jul. 20, 2023, the entire contents of which are incorporated herein by reference.

BACKGROUND

Since strong absorption derived from the fundamental vibration of molecules is observed in mid-infrared light (wavelength of 3 μm to 20 μm), the mid-infrared light is used for absorption spectroscopy (spectroscopic measurement) targeting gas molecules. As disclosed in Non-Patent Document 1 (Donald R. Herriott and Harry J. Schulte, "Folded Optical Delay Lines", Applied Optics vol. 4, pp. 883 to 889, Aug. 1, 1965), as a technique for improving the sensitivity of the above-described absorption spectroscopy, there is known a technique called a Herriott cell in which two concave mirrors are disposed to face each other and light is multiply reflected between the two concave mirrors to realize a long optical path.

SUMMARY

However, since the gas absorption spectroscope using the concave mirrors like the Herriott cell disclosed in Non-Patent Document 1 requires high processing accuracy and high assembly accuracy, there is a problem in that the cost is increased and the size of the device is easily increased.

Accordingly, it is an object of an aspect of the present disclosure to provide a light measuring device capable of achieving simplification and miniaturization of the device, and a method of manufacturing the light measuring device.

The present disclosure includes the following light measuring device [1] to [21] and a method [22] of manufacturing a light measuring device.

[1] A light measuring device including: a light source unit configured to emit a laser beam; a mirror unit including a first plane mirror having a first mirror surface on which the laser beam emitted from the light source unit is incident and a second plane mirror having a second mirror surface opposite to the first mirror surface, wherein a measurement target is introduced between the first mirror surface and the second mirror surface; a light detector configured to detect the laser beam returned by multiple reflection between the first mirror surface and the second mirror surface; and wherein the first mirror surface and the second mirror surface are arranged non-parallel to each other when viewed from a third direction orthogonal to a first direction orthogonal to the first mirror surface and a second direction orthogonal to the first direction so as to form an optical path of the laser beam reciprocating in the second direction while performing multiple reflection between the first mirror surface and the second mirror surface, and an optical path of the laser beam between the first mirror surface and the second mirror surface is inclined with respect to the third direction.

According to the light measuring device, it is possible to realize a light measuring device having a long optical path by a configuration in which two plane mirrors (first plane mirror and second plane mirror) are disposed to face each other in a non-parallel manner (that is, an inexpensive and simple configuration compared to a configuration of a Herriott cell or the like using a conventional concave mirror). Since the outward path and the return path of the laser beam between the plane mirrors can be spatially separated in the third direction by setting the optical path of the laser beam between the plane mirrors to be inclined with respect to the third direction, it is possible to appropriately perform light measurement (for example, absorbance measurement of a predetermined wavelength (single wavelength), absorption spectrometry for a plurality of wavelengths, or the like) of the measurement target introduced between the plane mirrors. More specifically, it is possible to prevent the light in the outward path and the light in the return path from interfering with each other between the plane mirrors, to prevent the laser beam returned by the mirror unit from reentering the light source unit, and to appropriately guide the returned light to the light detector. Therefore, according to the light measuring device, simplification (cost reduction) and miniaturization of the device can be achieved.

[2] The light measuring device according to [1], wherein the optical path of the laser beam initially incident on the first mirror surface is inclined with respect to the third direction; and the first mirror surface and the second mirror surface are parallel to the third direction.

According to the above configuration, by inclining the optical path of the laser beam initially incident on the first mirror surface with respect to the third direction, it is possible to easily realize a configuration in which the optical path of the laser beam between the plane mirrors is inclined with respect to the third direction without inclining the first plane mirror and the second plane mirror with respect to the third direction.

[3] The light measuring device according to [1] or [2], wherein an incident angle of the laser beam first incident on the first mirror surface when viewed from the third direction with respect to the first mirror surface is adjusted to be a natural number multiple of a tilt angle of the second mirror surface with respect to the first mirror surface when viewed from the third direction.

According to the above configuration, the optical path of the laser beam between the plane mirrors can be set such that the outward path and the return path of the laser beam between the plane mirrors overlap with each other when viewed from the third direction. This makes it possible to easily arrange an outward path optical system for guiding the laser beam from the light source unit to the mirror unit and a return path optical system for guiding the return light returned from the mirror unit to the light detector.

[4] The light measuring device according to any one of [1] to [3], wherein a distance along the second direction from a position where the laser beam is first incident on the first mirror surface to an end portion of the first mirror surface in an outward direction of the laser beam is equal to or less than 300 mm.

According to the above configuration, it is possible to more effectively reduce the size of the device.

[5] The light measuring device according to any one of [1] to [4], wherein a length of the mirror unit in the third direction is equal to or less than 50 mm.

According to the above configuration, by suppressing the height of the mirror unit in the third direction to a certain level or lower, it is possible to reduce the size of the device and suppress the amount of measurement target (for example, gas) introduced (filled) between the plane mirrors to a certain level or lower. That is, only by introducing a relatively small amount of measurement target between the plane mirrors, it is possible to perform optical measurement of the measurement target.

[6] The light measuring device according to any one of [1] to [5], wherein an end portion of the first mirror surface in a return direction of the laser beam protrudes in the return direction more than an end portion of the second mirror surface in the return direction.

According to the above configuration, it is possible to easily cause the laser beam to enter the first mirror surface. In addition, in a case where the beam diameter of the laser beam is expanded through propagation of a long optical path due to multiple reflection between the plane mirrors, it is possible to suppress the laser beam finally reflected by the first mirror surface and guided to the light detector side from being blocked by the second mirror surface (that is, the beam loss of the return light from occurring).

[7] The light measuring device according to [6], wherein when an incident angle of the laser beam first incident on the first mirror surface when viewed from the third direction with respect to the first mirror surface is represented by $\theta_H$, a distance along the second direction from the end portion of the second mirror surface in the return direction of the laser beam to the end portion of the first mirror surface in the return direction is set to be equal to or greater than a value obtained by multiplying $\tan \theta_H$ by a distance between the first mirror surface and the end portion of the second mirror surface along the first direction.

According to the above configuration, it is possible to avoid a beam loss caused by the return light reflected at the end portion of the second mirror surface in the return direction and traveling toward the first mirror surface escaping to the outer side (return direction side) of the end portion of the first mirror surface in the return direction.

[8] The light measuring device according to [7], wherein a distance along the second direction from the end portion of the second mirror surface in the return direction to the end portion of the first mirror surface in the return direction is set to a value obtained by multiplying $\tan \theta_H$ by a distance between the first mirror surface and the end portion of the second mirror surface along the first direction.

According to the above configuration, the effect of [7] is obtained. In addition, by setting the projection length of the first plane mirror (first mirror surface) with respect to the second plane mirror (second mirror surface) to a length necessary and sufficient to avoid the beam loss, it is possible to achieve both avoidance of the beam loss and downsizing of the device.

[9] The light measuring device according to any one of [1] to [8], wherein a tilt angle of the second mirror surface with respect to the first mirror surface when viewed from the third direction is set to be larger than a spread angle of the laser beam passing between the first mirror surface and the second mirror surface when viewed from the third direction.

According to the above configuration, in a case where the beam diameter of the laser beam expands through propagation of a long optical path due to multiple reflection between the plane mirrors, it is possible to effectively suppress the beam loss of the return light.

[10] The light measuring device according to any one of [1] to [9], wherein the light source unit and the light detector are arranged to overlap with each other in the third direction.

By inclining the optical path of the laser beam between the plane mirrors with respect to the third direction, the optical path of the laser beam guided from the light source unit to the mirror unit and the optical path of the return light guided from the mirror unit to the light detector can be separated in the third direction. By arranging the light source unit and the light detector side by side in the third direction using this, it is possible to reduce areas required for arrangement of the light source unit and the light detector (areas when viewed from the third direction) compared to a case where the light source unit and the light detector are arranged without overlapping with each other in the third direction. As a result, the size of the device can be reduced more effectively.

[11] The light measuring device according to any one of [1] to [10], further including a lens disposed on a side of the light source unit from which the laser beam is emitted and configured to condense or collimate the laser beam, wherein the light source unit is a quantum cascade laser element, and a distance between the lens and the quantum cascade laser element is shorter than the shortest distance between the first mirror surface and the second mirror surface in the first direction.

According to the above configuration, the lens can effectively suppress the spread of the laser beam emitted from the light source unit. As a result, the spread of the beam diameter of the laser beam between the plane mirrors can be suppressed, and the beam loss of the return light caused by the spread of the beam diameter can be reduced.

[12] The light measuring device according to any one of [1] to [11], wherein the light source unit is a quantum cascade laser element, and the light detector is a quantum cascade photodetector having a characteristic corresponding to that of the quantum cascade laser element.

According to the above configuration, by using the quantum cascade laser element and the quantum cascade photodetector operating in mid-infrared region as the light source unit and the light detector, strong absorption derived from the fundamental vibration of molecules can be observed, and thus it is possible to perform light measurement with high sensitivity.

[13] The light measuring device according to [12], wherein the characteristic is a characteristic related to a polarization direction, and the light source unit and the light detector are arranged such that a polarization direction of the laser beam emitted from the light source unit and then incident on the light detector via the mirror unit coincides with a polarization direction to which the light detector is sensitive.

According to the above configuration, it is possible to prevent stray light components in which the polarization direction is disturbed due to scattering or the like from being detected as noise by the light detector, and to improve the signal-to-noise ratio (S/N).

[14] The light measuring device according to [12] or [13], wherein the characteristic is a characteristic related to a wavelength, and the light detector has a sensitive wavelength corresponding to an oscillation wavelength of the light source unit.

According to the above configuration, since the quantum cascade photodetector functions as a wavelength filter in a pseudo manner, it is possible to suppress the influence of background light noise and perform high-sensitivity light measurement.

[15] The light measuring device according to any one of [1] to [14], further including: a first guide mirror configured to reflect the laser beam emitted from the light source unit to guide the laser beam to the first mirror surface; and a second guide mirror configured to guide the laser beam to the light detector by reflecting the returned laser beam, wherein the first guide mirror and the second guide mirror are disposed so as to overlap with each other in the third direction.

According to the above configuration, by using the first guide mirror and the second guide mirror, it is possible to improve the flexibility of arrangement (layout) of the light source unit and the light detector with respect to the mirror unit. In addition, by arranging the first guide mirror and the second guide mirror side by side in the third direction, it is possible to reduce an area necessary for arranging the first guide mirror and the second guide mirror (an area when viewed from the third direction) compared to a case in which the first guide mirror and the second guide mirror are arranged without overlapping with each other in the third direction, and it is also possible to achieve miniaturization of the device.

[16] The light measuring device according to any one of [1] to [15], wherein the light source unit includes: a first light source unit configured to emit the laser beam having a first wavelength; and a second light source unit configured to emit the laser beam having a second wavelength different from the first wavelength, the light detector includes: a first light detector configured to detect the laser beam of the first wavelength reflected and returned by multiple reflection between the first mirror surface and the second mirror surface; and a second light detector configured to detect the laser beam of the second wavelength reflected and returned by multiple reflection between the first mirror surface and the second mirror surface, and the first light source unit, the second light source unit, the first light detector, and the second light detector are arranged to overlap with each other in the third direction.

According to the above configuration, by arranging the first light source unit, the second light source unit, the first light detector, and the second light detector so as to overlap with each other in the third direction, it is possible to compactly arrange the light source units and the light detectors of the two systems. In addition, by making the wavelength band different between the systems, it is possible to simultaneously perform absorption spectroscopic measurement of two wavelength bands different from each other.

[17] The light measuring device according to any one of [1] to [15], wherein the light source unit includes: a first light source unit configured to emit the laser beam having a first wavelength; and a second light source unit configured to emit the laser beam having a second wavelength different from the first wavelength, the light detector includes: a first light detector configured to detect the laser beam of the first wavelength reflected and returned by multiple reflection between the first mirror surface and the second mirror surface; and a second light detector configured to detect the laser beam of the second wavelength reflected and returned by multiple reflection between the first mirror surface and the second mirror surface, and the first light source unit and the second light source unit are arranged side by side in the first direction, the first light detector and the second light detector are arranged side by side in the first direction, the first light source unit and the first light detector are disposed so as to overlap with each other in the third direction, and the second light source unit and the second light detector are disposed so as to overlap with each other in the third direction.

According to the above-described configuration, the first light source unit and the first light detector are arranged to overlap with each other in the third direction, and the second light source unit and the second light detector are arranged to overlap with each other in the third direction. Thus, the light source units and the light detectors of the two systems can be arranged in a compact manner. In addition, by making the wavelength band different between the systems, it is possible to simultaneously perform absorption spectroscopic measurement of two wavelength bands different from each other.

[18] The light measuring device according to any one of [1] to [17], further including a housing configured to hermetically accommodate the mirror unit, wherein the measurement target is a gas, the housing is provided with an opening for introducing the gas from an outside of the housing to an inside of the housing, and the light source unit and the light detector are disposed outside the housing.

According to the above configuration, it is possible to perform more precise measurement by reducing the pressure inside the housing that airtightly accommodates only the mirror unit and introducing the gas from the opening.

[19] The light measuring device according to any one of [1] to [18], further including a housing configured to accommodate the light source unit, the light detector, and the mirror unit, wherein the measurement target is a gas, and the housing is provided with an opening for introducing the gas from an outside of the housing to an inside of the housing.

According to the above configuration, by housing the light source unit, the light detector, and the mirror unit in one housing, it is possible to appropriately protect each member constituting the light measuring device from external contamination, mechanical impact, or the like.

[20] The light measuring device according to any one of [1] to [19], wherein the measurement target is a gas, and the light source unit is configured to be capable of emitting the laser beam having a first wavelength that is absorbed by the gas and the laser beam having a second wavelength that is less absorbed by the gas than the first wavelength.

According to the above-described configuration, it is possible to perform analysis based on a difference between a measurement value corresponding to the first wavelength and a measurement value corresponding to the second wavelength, that is, measurement of gas concentration by differential absorption spectroscopy.

[21] The light measuring device according to [20], wherein the light source unit is configured to be able to emit the laser beam while switching between the laser beam of the first wavelength and the laser beam of the second wavelength based on light emitted from a single laser element.

According to the above configuration, by the single laser beam source, the above configuration of [20] can be realized.

[22] A method of manufacturing the light measuring device according to any one of [1] to [21], wherein the light measuring device further includes: a first guide mirror configured to reflect the laser beam emitted from the light source unit to guide the laser beam to the first mirror surface; and a second guide mirror configured to guide the laser beam to the light detector by reflecting the returned laser beam, the method includes: a step of fixing each of the light source unit, the light detector, the mirror unit, and the second guide mirror; and a step of adjusting and fixing a position and an angle of the first guide mirror after the step of fixing so that a light detection intensity in the light detector is maximized while emitting the laser beam from the light source unit.

According to the above configuration, after the light source unit, the light detector, the mirror unit, and the second guide mirror are positioned (fixed) in advance within a range of mechanical accuracy, it is possible to perform precise angle adjustment or the like of the first guide mirror based on a relatively simple indicator that maximizes the light detection intensity in the light detector. The above method is particularly effective when the laser beam emitted from the light source unit is invisible mid-infrared light.

According to an aspect of the present disclosure, it is possible to provide a light measuring device capable of achieving simplification and miniaturization of the device, and a method of manufacturing the light measuring device.

DETAILED DESCRIPTION

Hereinafter, an embodiment of the present disclosure will be described in detail with reference to the drawings. In the following description, the same or corresponding elements are denoted by the same reference signs, and redundant description will be omitted.

First Embodiment

Figure 1:
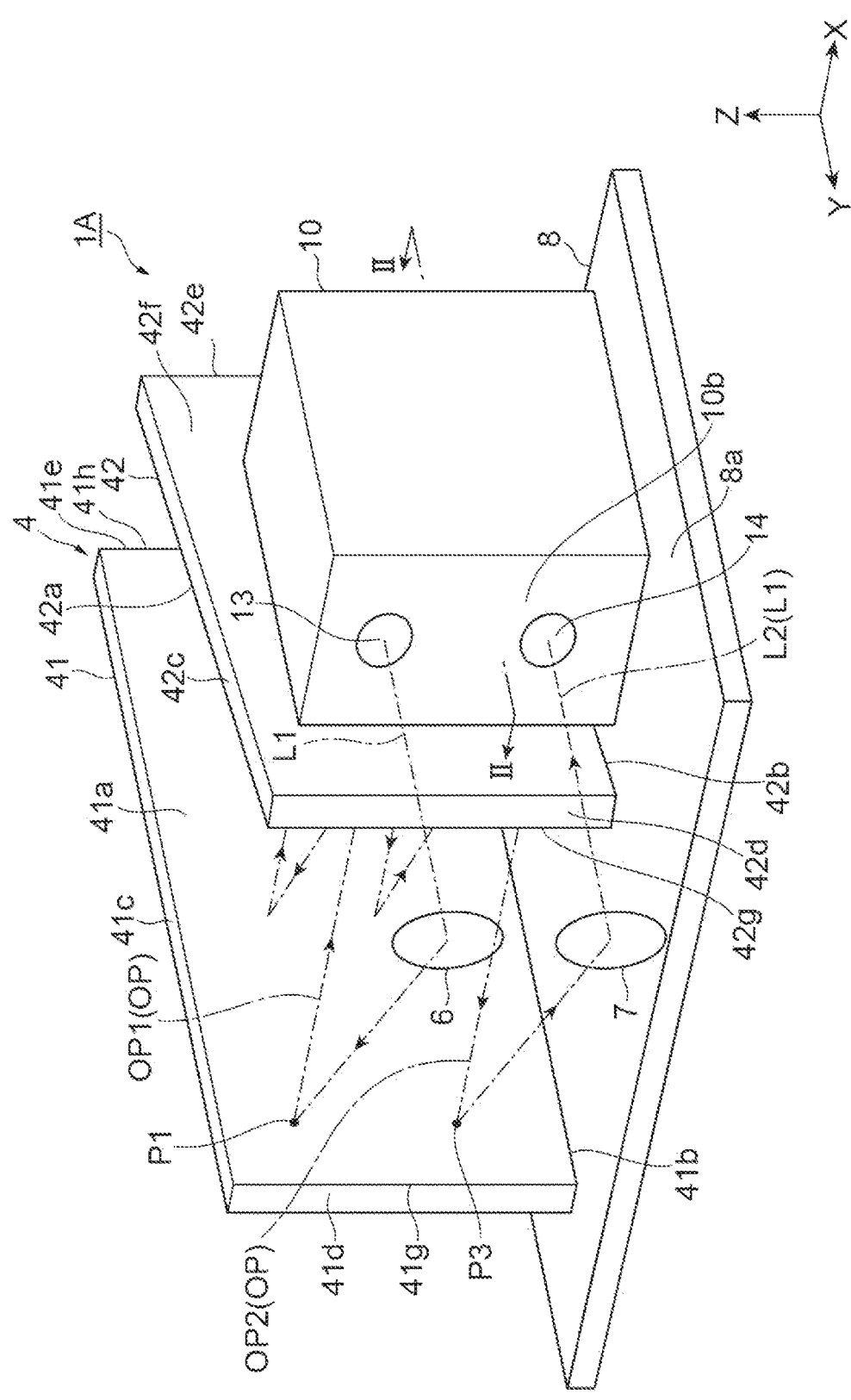
FIG. 1 is a schematic perspective view of a spectrometer of a first embodiment.
Figure 2:
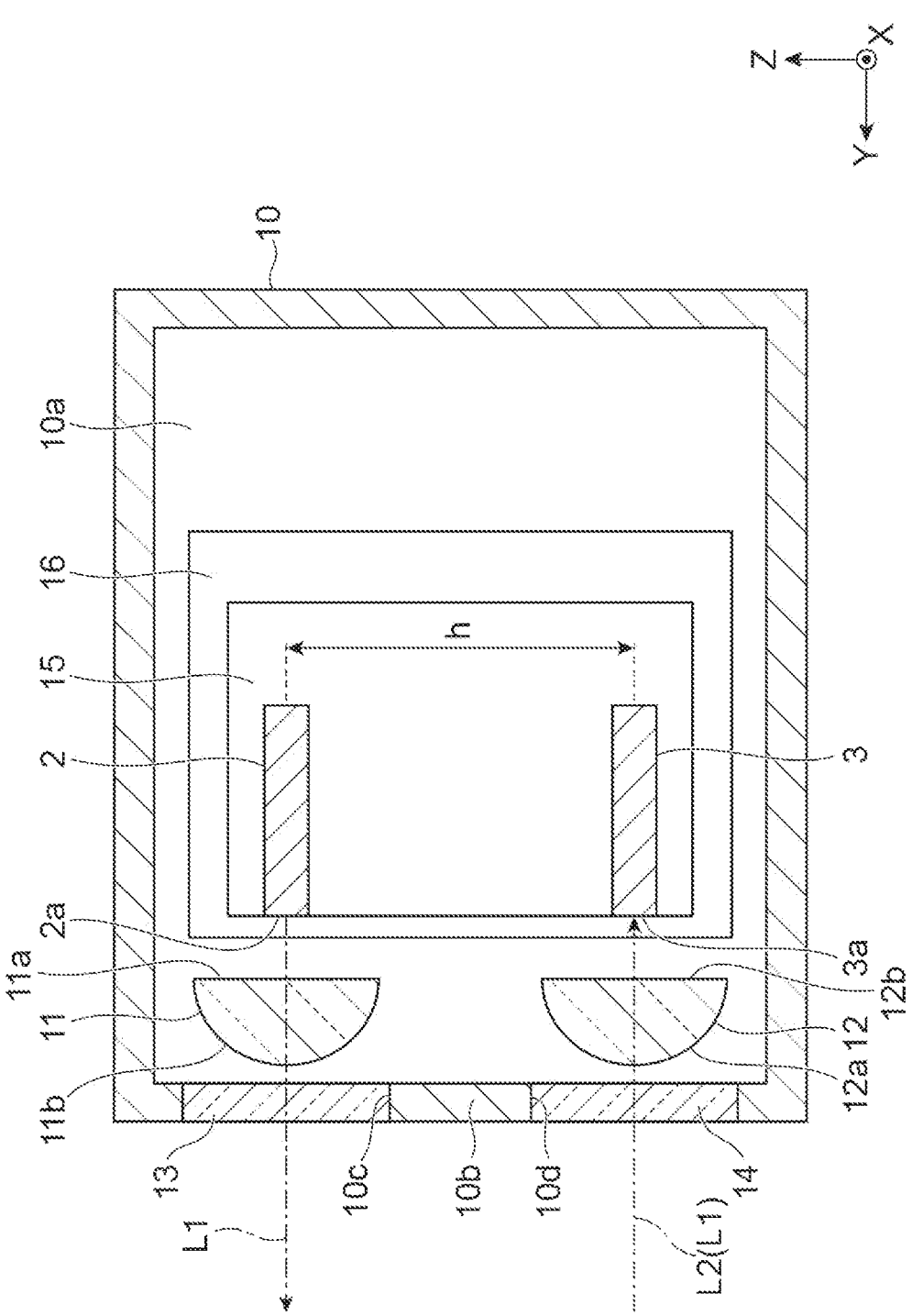
FIG. 2 is a cross-sectional view of a housing taken along line II-II of FIG. 1.

A spectrometer 1A (light measuring device) according to a first embodiment will be described with reference to FIGS. 1 to 9. As illustrated in FIGS. 1 and 2, the spectrometer 1A includes a light source unit 2, a light detector 3, a mirror unit 4, an incident adjustment mirror 6 (first guide mirror), a light guide mirror 7 (second guide mirror), and a support unit 8. The mirror unit 4 includes a plane mirror 41 (first plane mirror) having a mirror surface 41a (first mirror surface) and a plane mirror 42 (second plane mirror) having a mirror surface 42a (second mirror surface) opposite to the mirror surface 41a. Between the mirror surface 41a and the mirror surface 42a, a gas (measurement target) to be measured is introduced.

As an example, the light source unit 2 and the light detector 3 are accommodated in the same housing 10. The housing 10 has a substantially rectangular parallelepiped outer shape and is disposed on a side of the mirror unit 4. More specifically, the housing 10 is disposed on a side of the plane mirror 42 on a side opposite to a side where the plane mirror 41 is located with respect to the plane mirror 42. In other words, the housing 10 is disposed at a position facing the back surface 42f on a side opposite to the mirror surface 42a of the plane mirror 42.

The support unit 8 is formed in a rectangular plate shape, and has a flat support surface 8a. The housing 10 and the mirror unit 4 are fixed (supported) on the support surface 8a of the support unit 8. The plane mirrors 41 and 42 are disposed on the support surface 8a such that the mirror surface 41a and the mirror surface 42a are perpendicular to the support surface 8a. The incident adjustment mirror 6 and the light guide mirror 7 may also be fixed to the support unit 8 via a support member such as a support rod (not shown).

In the following description, a direction orthogonal to the mirror surface 41a is referred to as an X-axis direction (first direction), a direction orthogonal to the support surface 8a is referred to as a Z-axis direction (third direction), and a direction orthogonal to the X-axis direction and the Z-axis direction is referred to as a Y-axis direction (second direction). The plane mirrors 41 and 42 are disposed such that the mirror surface 41a and the mirror surface 42a are not parallel to each other when viewed from the Z-axis direction (see FIG. 5). More specifically, the mirror surface 41a is inclined with respect to the mirror surface 42a such that the interval (the length in the X-axis direction) between the mirror surface 41a and the mirror surface 42a decreases toward the Y-axis negative direction. In the present embodiment, for the sake of convenience, the Y-axis negative direction (i.e., the direction in which the distance between the mirror surfaces 41a and 42a decreases) is defined as "rearward", and the Y-axis positive direction (i.e., the direction in which the distance between the mirror surfaces 41a and 42a increases) is defined as "forward". In addition, a side on which each member such as the mirror unit 4 is disposed with respect to the support surface 8a is defined as an "upper side".

As shown in FIG. 2, the housing 10 airtightly houses the lens 11, the lens 12, the heat sink 15, and the Peltier element 16 together with the light source unit 2 and the light detector 3. For example, the light source unit 2 and the light detector 3 are fixed to an inner surface of a side wall 10*a* of the housing 10 via a heat sink 15 and a Peltier element 16. The side wall 10*a* is a wall portion facing the mirror unit 4 (the plane mirror 42) of the housing 10. The Peltier element 16 is fixed to an inner surface of the side wall 10*a*, and the heat sink 15 is fixed to the Peltier element 16 on a side opposite to a side of the Peltier element 16 facing the side wall 10*a*. The light source unit 2 and the light detector 3 are fixed to the heat sink 15 on a side opposite to a side of the heat sink 15 facing the Peltier element 16. The Peltier element 16 serves to provide temperature control within the housing 10. That is, heat generated in the light source unit 2 is absorbed (cooled) by the Peltier element 16 via the heat sink 15, so that the temperatures of the light source unit 2 and the light detector 3 are maintained within a certain range. The arrangement and shape of the light source unit 2, the light detector 3, the heat sink 15, and the Peltier element 16 are not limited to those described above. For example, instead of the heat sink 15, an L-shaped heat sink including a flat first portion fixed to the side wall 10*a* and a flat second portion extending in the X-axis positive direction from a back end surface of the first portion may be used. Further, when such a heat sink is used, the Peltier element may be disposed such that the cooling surface of the Peltier element faces the rear surface of the second portion. Further, a secondary cooling unit such as a fan for cooling the Peltier element may be provided on the rear side (heat exhaust side) of the Peltier element in this manner.

The light source unit 2 is a light source that emits laser beam L1. For example, the light source unit 2 may be a quantum cascade laser element including an active layer. As an example, the light source unit 2 is a distributed feedback quantum cascade laser element (DFB-QCL). In this embodiment, the light source unit 2 is a DFB-QCL operating in a single mode at a wavelength of 4.6 μm. The active layer is a layer including a quantum well structure in which quantum well layers and barrier layers are alternately stacked, and generates the laser beam L1. The active layer has, for example, a structure in which a plurality of InGaAs layers and InAlAs layers are alternately stacked along a stack direction. The light source unit 2 is disposed so as to emit laser beam L1 forward (in the Y-axis positive direction). That is, the light source unit 2 has a light exit surface 2*a* that faces forward and emits laser beam L1 forward.

The lens 11 is disposed on a side of the light source unit 2 from which the laser beam L1 is emitted (that is, in front of the light source unit 2). The lens 11 serves to suppress the spread of the laser beam L1 by condensing or collimating the laser beam L1. As an example, the lens 11 is a collimating lens that collimates the laser beam L1. The lens 11 has an incident surface 11*a* on which the laser beam L1 is incident and an exit surface 11*b* from which the laser beam L1 having passed through the lens is emitted to the outside. As an example, the incident surface 11*a* may be formed in a flat shape, and the exit surface 11*b* may be formed in a convex shape. From the viewpoint of reducing the size of the housing 10, for example, an aspherical lens made of ZnSe having a focal distance of 10 mm or less can be used as the lens 11. The incident surface 11*a* and the exit surface 11*b* of the lens 11 may be coated with a low-reflection coating having a transmissivity of 90% or more with respect to the wavelength of the laser beam L1. In addition, the base material of the lens 11 is not limited to ZnSe, and may be configured by another material capable of transmitting mid-infrared light (laser beam L1) with low losses. In the present embodiment, the lens 11 is constituted by a ZnSe aspherical lens having a focal distance of 1 mm and a lens diameter of 5 mm.

An opening 10*c* through which the laser beam L1 emitted from the light source unit 2 (the laser beam L1 collimated by the lens 11) passes is provided at a portion of the front side wall 10*b* of the housing 10, which faces the exit surface lib of the lens 11. A window member 13 for transmitting the laser beam L1 is provided in the opening 10*c*. As the material of the window member 13, for example, ZnSe can be used similarly to the lens 11. In addition, a low reflection coating similar to that of the lens 11 may be applied to an inner surface (a surface facing the lens 11) and an outer surface (a surface opposite to the inner surface) of the window member 13.

As illustrated in FIGS. 1 and 2, the laser beam L1 emitted from the light source unit 2 passes through the lens 11 and the window member 13 and is incident on a position P1 of the mirror surface 41*a* of the plane mirror 41 under predetermined angle conditions ($\theta_H$ and $\theta_V$ to be described below) through the incident adjustment mirror 6. The position P1 is a position where the mirror surface 41*a* intersects with the optical axis of the laser beam L1 that is first incident on the mirror surface 41*a*. An optical path OP of the laser beam L1 that reciprocates in the front-back direction (the Y-axis direction) while performing multiple reflection between the mirror surfaces 41*a* and 42*a* is formed between the plane mirrors 41 and 42. The optical path OP includes an outward path OP1 in which the laser beam L1 advances in an outward direction and a return path OP2 in which the laser beam L1 (return light L2) is returned and advances in a return direction.

The laser beam L1 incident on the mirror surface 41*a* travels rearward (in the Y-axis negative direction) while undergoing multiple reflection between the mirror surface 41*a* and the mirror surface 42*a*. That is, the outward path OP1 is formed between the plane mirrors 41 and 42 while being multiply reflected in the outward direction from the position P1. Thereafter, the return light L2, which is the laser beam L1 whose traveling direction is returned from the rear side to the front side, travels forward (in the Y-axis positive direction) while being multiply reflected between the mirror surface 41*a* and the mirror surface 42*a*. That is, between the plane mirrors 41 and 42, a return path OP2 is formed which is directed forward (return direction) from a return point (in the present embodiment, a position P2 (see FIG. 5) which will be described later) while performing multiple reflection.

The return light L2 finally reflected at a position P3 of the mirror surface 41*a* is guided to the housing 10 via the light guide mirror 7. The position P3 is a position where the optical axis of the return light L2 finally incident on the mirror surface 41*a* intersects with the mirror surface 41*a*, and is a final arrival point of the return path OP2.

The light detector 3 detects the laser beam L1 (return light L2) returned by multiple reflection between the mirror surfaces 41*a* and 42*a* as described above. The light detector 3 includes a light detection surface 3*a* that faces forward and receives (detects) the return light L2 incident from the front. For example, the light detector 3 may be a quantum cascade photodetector (QCD) having characteristics corresponding to those of the quantum cascade laser element (the light source unit 2). The quantum cascade photodetector includes an active layer similar to the quantum cascade laser element described above. By using a quantum cascade laser element and a quantum cascade photodetector operating in mid-infrared region as the light source unit 2 and the light detector 3, strong absorption derived from the fundamental vibration of molecules can be observed, so that absorption spectroscopy with high sensitivity can be performed. Examples of the above-described characteristics include characteristic related to polarization direction and characteristic related to wavelength described below.

(Characteristic Regarding Polarization Direction)

Figure 3:
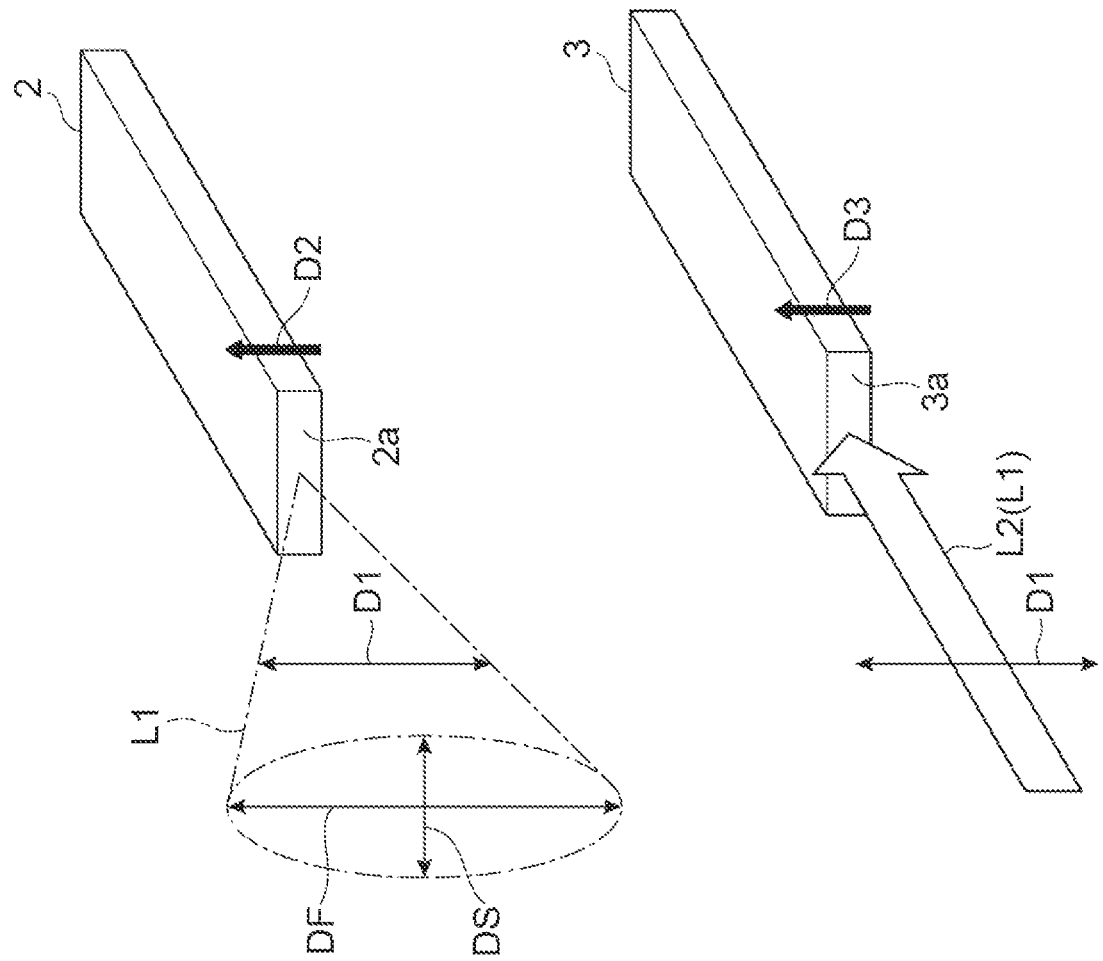
FIG. 3 is a diagram used to describe polarization characteristics of a light source unit and a light detector.

The quantum cascade laser element and the quantum cascade photodetector have polarization dependence common to each other. Therefore, as illustrated in FIG. 3, the light source unit 2 (quantum cascade laser element) and the light detector 3 (quantum cascade photodetector) may be disposed such that the polarization direction D1 of the laser beam L1 (i.e., the return light L2) emitted from the light source unit 2 and incident on the light detector 3 via the mirror unit 4 matches the polarization direction to which the light detector 3 has sensitivity. Here, the polarization direction D1 of the laser beam L1 is an electric field oscillation direction of the laser beam L1, and is a direction parallel to the stack direction D2 of the active layer included in the light source unit 2. The polarization direction to which the light detector 3 has sensitivity is a direction parallel to the stack direction D3 of the active layer included in the light detector 3. Therefore, the light detector 3 may be disposed such that the polarization direction D1 of the return light L2 (laser beam L1) incident on the light detector 3 coincides with the stack direction D3 (that is, the polarization direction to which the light detector 3 has sensitivity). According to the above configuration, it is possible to prevent stray light components in which the polarization direction is disturbed due to scattering or the like on the optical path from the light exit surface 2a to the light detection surface 3a from being detected as noise by the light detector 3, and to improve the signal-to-noise ratio (S/N).

(Characteristic Regarding Wavelength)

Figure 4:
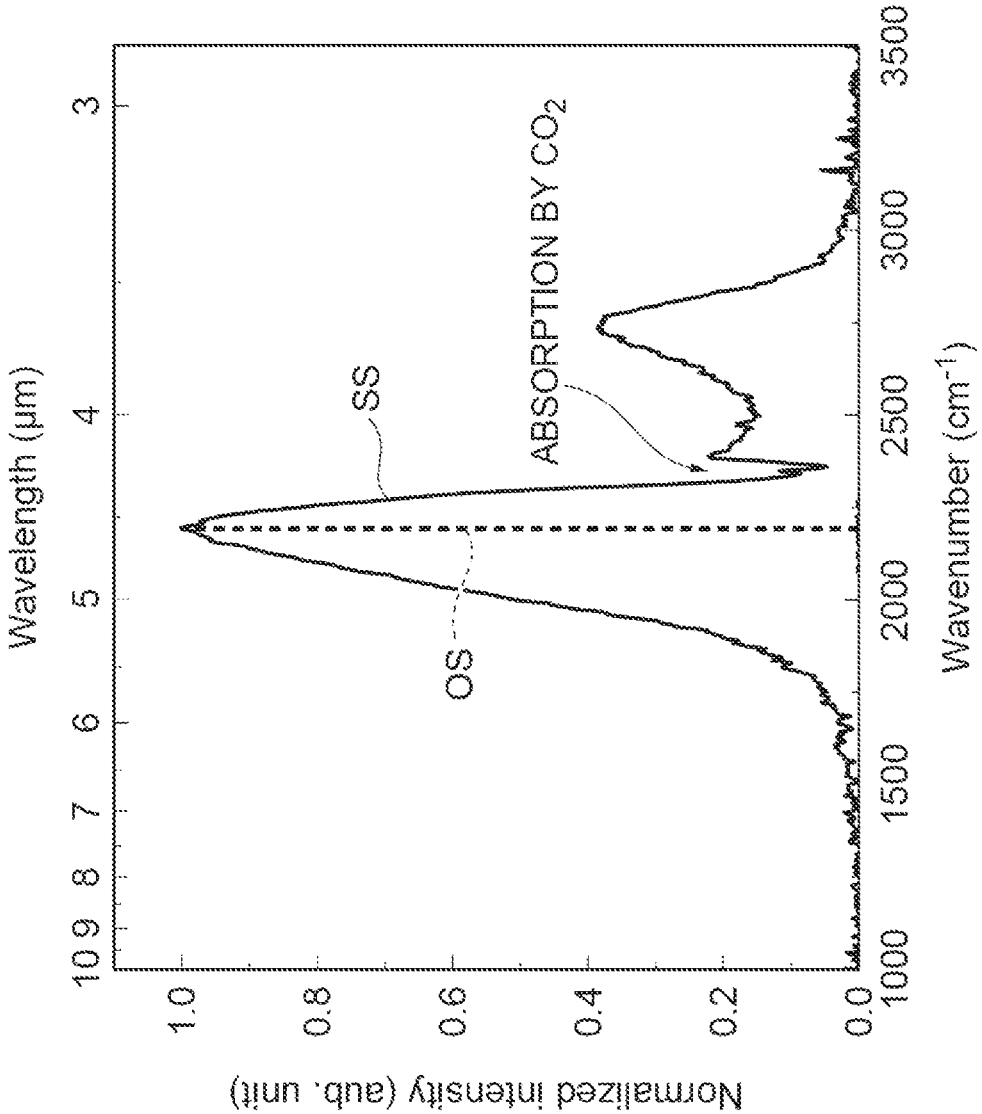
FIG. 4 is a diagram showing an example of an oscillation spectrum of the light source unit and a sensitivity spectrum of the light detector.

As shown in FIG. 4, the light detector 3 may have a sensitive wavelength corresponding to an oscillation wavelength (e.g., 4.6 μm) of the light source unit 2. In FIG. 4, "OS" indicates an oscillation spectrum of the light source unit 2, and "SS" indicates a sensitivity spectrum of the light detector 3. FIG. 4 shows an example in which carbon dioxide gas ($CO_2$) is introduced between the plane mirrors 41 and 42 as a gas to be measured. The light detector 3 is designed to have the maximum sensitivity to the oscillation wavelength (4.6 μm) of the light source unit 2, for example. For example, the oscillation wavelength of the light source unit 2 may be set to a value (4.6 μm) near the absorption band of the gas to be measured (4.3 μm which is the absorption band of $CO_2$ in the example of FIG. 4) in the infrared region, and the peak of the sensitive wavelength of the light detector 3 may be matched with the oscillation wavelength of the light source unit 2. As shown in the sensitivity spectrum SS of FIG. 4, the quantum cascade photodetector has a narrower sensitive wavelength range than a general photodetector. Therefore, the light detector 3, which is a quantum cascade photodetector, functions as a wavelength filter in a pseudo manner. Therefore, as described above, for example, by matching the wavelength at which the sensitivity of the light detector 3 becomes maximum with the oscillation wavelength of the light source unit 2, it is possible to suppress the influence of the background light noise and perform absorption spectroscopy with high sensitivity.

The lens 12 is disposed on a side of the light detector 3 on which the return light L2 is incident (that is, in front of the light detector 3). The lens 12 is a condensing lens that condenses the return light L2. The lens 12 has an incident surface 12a on which the return light L2 is incident and an exit surface 12b from which the return light L2 that has passed through the lens is emitted toward the light detection surface 3a. For example, the incident surface 12a may be formed in a convex shape, and the exit surface 12b may be formed in a flat shape. For example, like the lens 11, the lens 12 may be constituted by an aspherical lens made of ZnSe having a focal distance equal to or less than 10 mm. The incident surface 12a and the exit surface 12b of the lens 12 may be coated with a low-reflection coating having a transmissivity of 90% or more with respect to the wavelength of the return light L2. In addition, the base material of the lens 12 is not limited to ZnSe, and may be configured by another material capable of transmitting mid-infrared light (laser beam L1) with low losses. In the present embodiment, like the lens 11, the lens 12 is configured by a ZnSe aspheric lens having a focal distance of 1 mm and a lens diameter of 5 mm.

An opening 10b for guiding the return light L2 into the housing 10 is provided in a portion of the side wall 10d of the housing 10 that faces the incident surface 12a of the lens 12. The opening 10d is provided with a window member 14 for transmitting the return light L2. The window member 14 may be formed of a material similar to that of the window member 13. In addition, a low reflection coating similar to that of the lens 12 may be applied to an inner surface (a surface facing the lens 12) and an outer surface (a surface opposite to the inner surface) of the window member 14.

In the housing 10, the light source unit 2 and the light detector 3 are disposed so as to overlap with each other in the Z-axis direction. In the present embodiment, as an example, the light source unit 2 is disposed above the light detector 3. As shown in FIG. 2, the optical axis of the light source unit 2 (i.e., the axial line passing through the center of the light exit surface 2a) and the optical axis of the light detector 3 (i.e., the axial line passing through the center of the light detection surface 3a) are separated from each other by a length "h" in the Z-axis direction. Similarly, the lens 11 and the window member 13 for the light source unit are disposed above the lens 12 and the window member 14 for the light detector, respectively, so as to overlap with the lens 12 and the window member 14 in the Z-axis direction.

The incident adjustment mirror 6 is disposed at a position facing the light exit surface 2a of the light source unit 2 and at a position on which the laser beam L1 passing through the lens 11 is incident. The incident adjustment mirror 6 reflects the laser beam L1 emitted from the light exit surface 2a of the light source unit 2, and guides the laser beam L1 to be incident on the mirror surface 41a (position P1) of the plane mirror 41 at predetermined angles (incident angles $\theta_H$ and $\theta_V$ described later). That is, the incident adjustment mirror 6 has a function of three dimensionally adjusting the incident angle of the laser beam L1 with respect to the mirror surface 41a. In the present embodiment, the incident adjustment mirror 6 guides the laser beam L1 so that the laser beam L1 advances rearward (in the Y-axis negative direction) and downward (in the Z-axis negative direction). In the present embodiment, the incident adjustment mirror 6 is a plane mirror. However, the incident adjustment mirror 6 may be a concave mirror. When the incident adjustment mirror 6 is a concave mirror, the spread of the laser beam L1 can be suppressed.

The light guide mirror 7 is disposed at a position facing the light detection surface 3a of the light detector 3 and at a position where the return light L2 finally reflected by the mirror surface 41a (position P3) is incident. The light guide mirror 7 guides the return light L2 to the light detection surface 3a of the light detector 3 by reflecting the return light L2. In the present embodiment, the light guide mirror 7 is a plane mirror. However, the light guide mirror 7 may be a concave mirror. When the light guide mirror 7 is a concave mirror, it is possible to suppress the spread of the return light L2.

Figure 7:
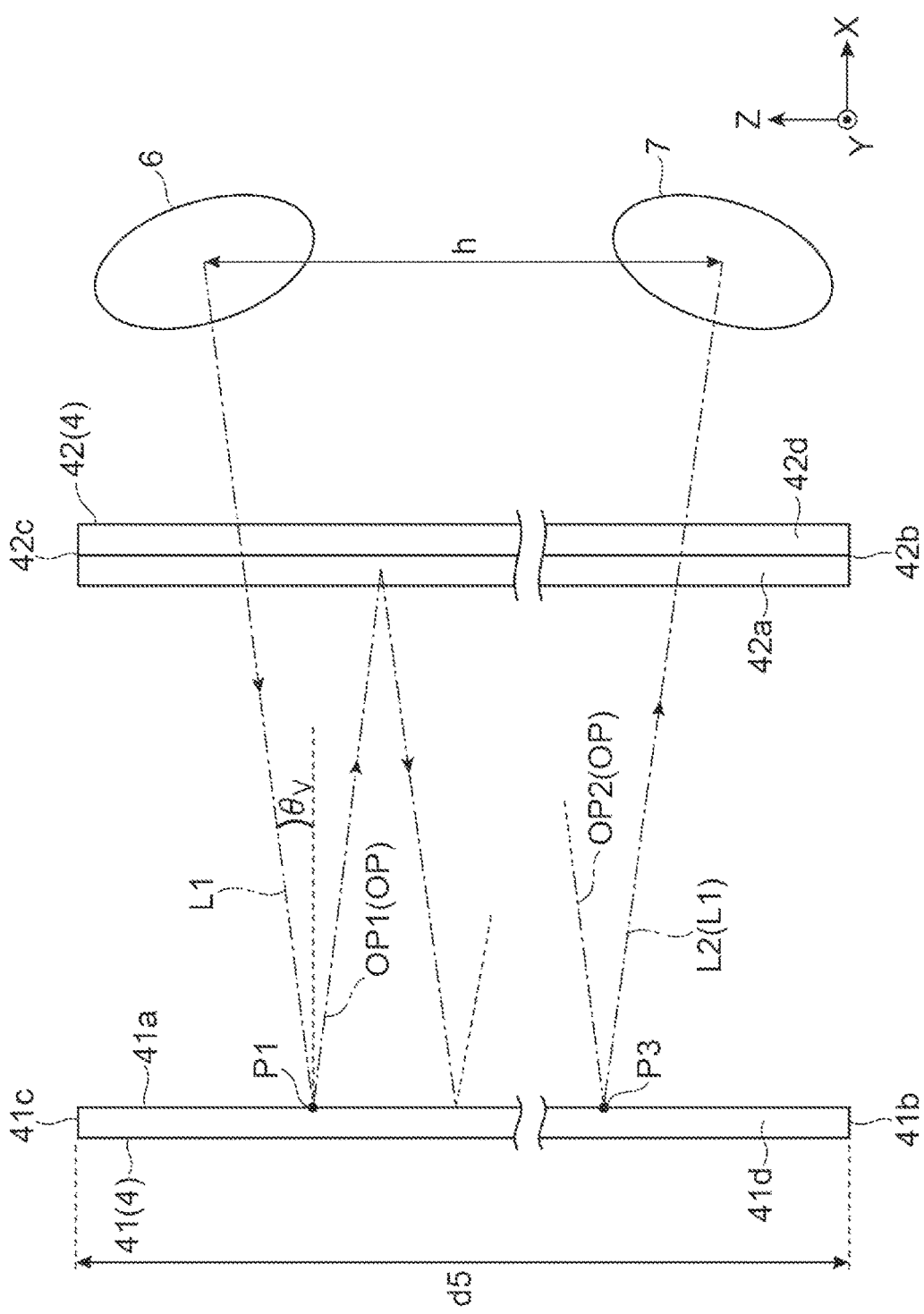
FIG. 7 is a diagram showing an optical path of a laser beam passing between a first guide mirror and a second guide mirror when viewed from the Y-axis direction.

In the present embodiment, the incident angle ($\theta_H$ and $\theta_V$ described later) of the laser beam L1 with respect to the position P1 is adjusted by the incident adjustment mirror 6 so that the outward path OP1 overlaps with (coincides with) the return path OP2 when viewed from the Z-axis direction and the outward path OP1 and the return path OP2 are shifted (separated) in the height direction (Z-axis direction). Accordingly, the incident adjustment mirror 6 and the light guide mirror 7 are disposed so as to overlap with each other in the Z-axis direction at different height positions. In the present embodiment, the incident adjustment mirror 6 is disposed above the light guide mirror 7. Further, the optical path of the laser beam L1 from the light source unit 2 to the incident adjustment mirror 6 and the optical path of the return light L2 from the light guide mirror 7 to the light detector 3 are both along the Y-axis direction. Therefore, as shown in FIG. 7, the distance between a position where the optical axis of the laser beam L1 intersects the incident adjustment mirror 6 and a position where the optical axis of the return light L2 intersects the light guide mirror 7 are equal to the distance "h" in the Z-axis direction between the light source unit 2 and the light detector 3 described above. The length "h" is set to, for example, 15 mm. In this case, the housing 10 can be configured to be smaller than a cube whose one side is 30 mm.

Next, the configuration of the mirror unit 4 and the optical path of the laser beam L1 formed by the mirror unit 4 will be described in detail with reference to FIGS. 1 and 5 to 7.

The plane mirror 41 is formed in a rectangular plate shape. The plane mirror 41 is disposed on a side opposite to a side on which the housing 10 is disposed with respect to the plane mirror 42. The plane mirror 41 includes a mirror surface 41a, a lower surface 41b, an upper surface 41c, a front end surface 41d, and a back end surface 41e. The lower surface 41b is a surface that is fixed to the support surface 8a. The upper surface 41c is the opposite surface of the lower surface 41b. The front end surface 41d is a surface facing forward (Y-axis positive direction), and the back end surface 41e is a surface facing rearward (Y-axis negative direction).

The plane mirror 42 is formed in a rectangular plate shape. The plane mirror 42 is disposed between the plane mirror 41 and the housing 10. The plane mirror 42 includes a mirror surface 42a, a lower surface 42b, an upper surface 42c, a front end surface 42d, a back end surface 42e, and a back surface 42f. The lower surface 42b is a surface that is fixed to the support surface 8a. The upper surface 42c is the opposite surface of the lower surface 42b. The front end surface 42d is a surface facing forward (Y-axis positive direction), and the back end surface 42e is a surface facing rearward (Y-axis negative direction). The back surface 42f is the opposite surface of the mirror surface 42a.

The mirror surfaces 41a and 42a of the plane mirrors 41 and 42 have, for example, surface accuracy such that the reflectivity with respect to target wavelength (oscillation wavelength of the laser beam L1 emitted from the light source unit 2) is 90% or more. Alternatively, the mirror surfaces 41a and 42a may be subjected to a surface treatment for realizing the above-described reflectivity. As an example, gold coating may be applied to the mirror surfaces 41a and 42a.

In the Y-axis direction, the front end portion 41g of the mirror surface 41a (that is, the boundary portion between the mirror surface 41a and the front end surface 41d) protrudes forward from the front end portion 42g of the mirror surface 42a (that is, the boundary portion between the mirror surface 42a and the front end surface 42d). In the present embodiment, in the Y-axis direction, the front end portion 41g is more distant than the front end portion 42g by a distance d3 (d3>0) forward. On the other hand, in the Y-axis direction, the position of the back end portion 41h of the mirror surface 41a (that is, the boundary portion between the mirror surface 41a and the back end surface 41e) coincides with the position of the back end portion 42h of the mirror surface 42a (that is, the boundary portion between the mirror surface 42a and the back end surface 42e).

Figure 5:
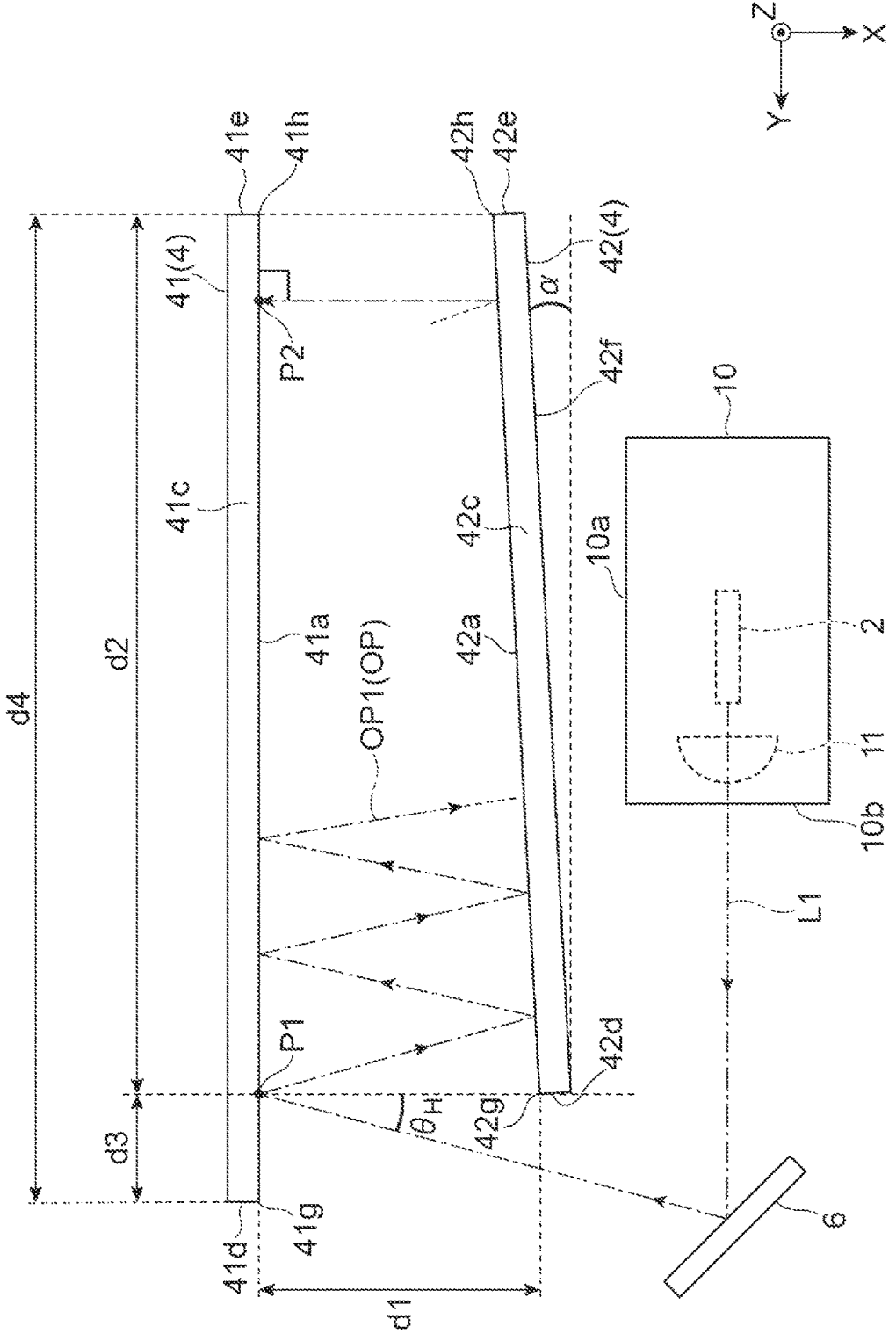
FIG. 5 is a plan view schematically showing an optical system related to a laser beam before being returned by a mirror unit.
Figure 6:
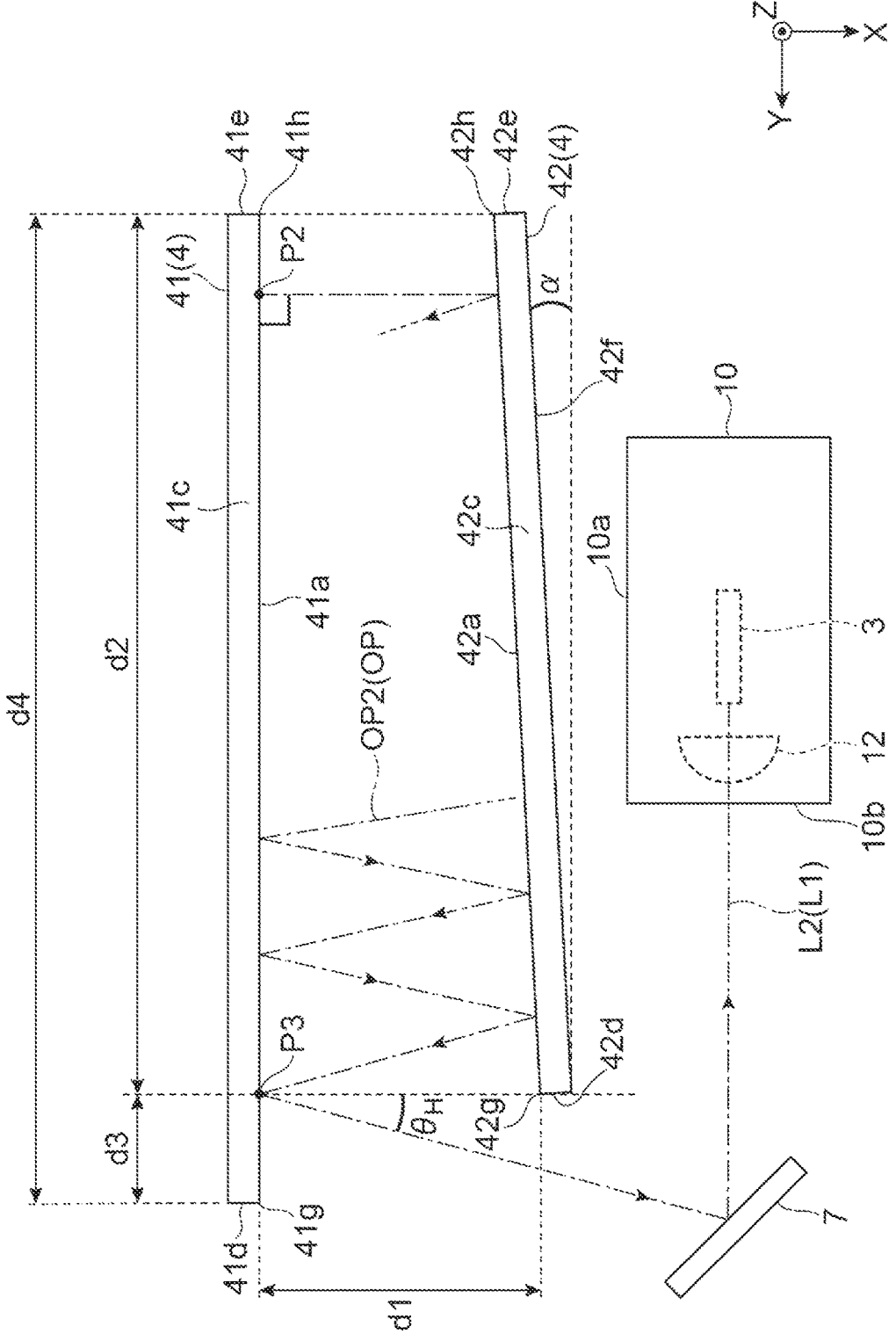
FIG. 6 is a plan view schematically showing an optical system related to a laser beam after being returned by the mirror unit.

As shown in FIGS. 5 and 6, the mirror surface 41a and the mirror surface 42a are arranged non-parallel to each other when viewed from the Z-axis direction so that the optical path OP of the laser beam L1 reciprocating in the Y-axis direction (front-back direction) while performing multiple reflection between the mirror surface 41a and the mirror surface 42a is formed. As described above, in the present embodiment, the outward path OP1 that proceeds rearward (in the Y-axis negative direction) and the return path OP2 that proceeds forward (in the Y-axis positive direction) are formed.

As shown in FIG. 5, when viewed from the Z-axis direction, the plane mirror 42 is tilted at a tilt angle α with respect to the plane mirror 41 so that the interval between the plane mirrors 41 and 42 (the interval in the X-axis direction between the mirror surfaces 41a and 42a) becomes shorter toward the rear (the Y-axis negative direction). That is, the plane mirror 42 is inclined with respect to the Y-axis direction (YZ plane) such that the mirror surface 42a approaches the mirror surface 41a toward the rear side when viewed from the Z-axis direction. Therefore, the distance between the mirror surface 41a and the mirror surface 42a in the X-axis direction becomes the longest distance d1 in the front end portion 42g of the mirror surface 42a. In the present embodiment, as an example, the distances d1 is 55 mm.

As shown in FIG. 5, the laser beam L1 is guided to the mirror surface 41a by the incident adjustment mirror 6 along a direction inclined with respect to the mirror surface 41a when viewed from the Z-axis direction. That is, when viewed from the Z-axis direction, the laser beam L1 reflected by the incident adjustment mirror 6 is incident on the position P1 (first incident position) of the mirror surface 41a at an incident angle $\theta_H$ ($\theta_H \neq 0$). As described above, the mirror surface 41a is inclined with respect to the mirror surface 42a (that is, the mirror surface 41a and the mirror surface 42a are opposed to each other in a non-parallel manner), and the laser beam L1 is incident on the mirror surface 41a at the incident angle $\theta_H$, thereby forming the optical path OP of the laser beam L1 that reciprocates in the front-back direction (Y-axis direction) while being multiply reflected between the mirror surface 41a and the mirror surface 42a.

As shown in FIG. 7, the laser beam L1 is guided to the mirror surface 41a along a direction inclined with respect to the Z-axis direction by the incident adjustment mirror 6. That is, the laser beam L1 reflected by the incident adjustment mirror 6 is guided to the mirror surface 41a not in a direction perpendicular to the Z-axis direction (that is, a direction along an XY plane parallel to the X-axis direction and the Y-axis direction) but in a direction inclined with respect to the XY plane. In the present embodiment, the laser beam L1 reflected by the incident adjustment mirror 6 is incident on the position P1 of the mirror surface 41a at an incident angle $\theta_V$ ($\theta_V \neq 0$) when viewed from the Y-axis direction. Thus, the height positions of the outward path OP1 and the return path OP2 are shifted, and the outward path OP1 and the return path OP2 can be spatially separated. Accordingly, the return light L2 is prevented from reentering the light exit surface 2a of the light source unit 2, and the operation of the light source unit 2 is prevented from being unstable.

As shown in FIG. 5, the position P1 is located behind the front end portion 41g of the mirror surface 41a. That is, assuming that the distance along the Y-axis direction from the position P1 to the back end portion 41h of the mirror surface 41a is d2, the length d4 of the mirror surface 41a in the Y-axis direction (that is, the distance from the front end portion 41g to the back end portion 41h) is longer than the distance d2. From the viewpoint of miniaturization of the spectrometer 1A, the distance d2 is set to be equal to or less than 300 mm, for example. In the present embodiment, as an example, the interval d2 is 150 mm. Further, in the present embodiment, the Y coordinate of the position P1 coincides with the Y coordinate of the front end portion 42g of the mirror surface 42a. Therefore, the length along the Y-axis direction from the position P1 to the front end portion 41g coincides with the length d3 along the Y-axis direction from the front end portion 42g to the front end portion 41g (i.e., the amount of protrusion of the front end portion 41g of the mirror surface 41a with respect to the front end portion 42g of the mirror surface 42a).

As an example, the incident angle $\theta_H$ is set to be a natural number multiple of the tilt angle $\alpha$. In this case, as shown in FIG. 5, the laser beam L1 incident on the position P1 of the mirror surface 41a travels backward (in the Y-axis negative direction) while being repeatedly reflected between the mirror surface 41a and the mirror surface 42a, but since the mirror surface 42a is inclined by the tilt angle $\alpha$ with respect to the mirror surface 41a, the incident angle of the laser beam L1 with respect to the mirror surface 41a when viewed from the Z-axis direction is decreased by the tilt angle $\alpha$ each time the laser beam L1 is reflected by the mirror surfaces 41a and 42a. As a result, the incident angle of the laser beam L1 with respect to the mirror surface 41a or the mirror surface 42a when viewed from the Z-axis direction finally becomes 0. That is, the laser beam L1 is perpendicularly incident on the mirror surface 41a or the mirror surface 42a when viewed from the Z-axis direction. When the incident angle $\theta_H$ is an even multiple of the tilt angle $\alpha$, the laser beam L1 is perpendicularly incident on the mirror surface 41a. When the incident angle $\theta_H$ is an odd multiple of the tilt angle $\alpha$, the laser beam L1 is perpendicularly incident on the mirror surface 42a.

FIG. 5 shows an example in which the incident angle $\theta_H$ is set to an even multiple of the tilt angle $\alpha$. The position P2 in FIG. 5 is a position where the laser beam L1 perpendicularly enters the mirror surface 41a when viewed from the Z-axis direction, and is the final arrival point of the outward path OP1. The outward path OP1 is an optical path of the laser beam L1 from the position P1 to the position P2. When the incident angle $\theta_H$ is an odd multiple of the tilt angle $\alpha$, the position P2 is not located on the mirror surface 41a but on the mirror surface 42a.

As illustrated in FIG. 6, the laser beam L1 (the return light P2) reflected and returned at the position P2 of the mirror surface 41a travels forward (in the Y-axis positive direction) while being repeatedly reflected between the mirror surface 41a and the mirror surface 42a so as to form an optical path (return path OP2) overlapping the outward path OP1 when viewed from the Z-axis direction. Finally, the return light L2 reflected at the position P3 of the mirror surface 41a is guided to the light guide mirror 7. The return path OP2 is an optical path of the return light L2 from the position P2 to the position P3.

Since the tilt angle $\alpha$ and the incident angle $\theta_H$ are adjusted so that the outward path OP1 and the return path OP2 overlap with each other when viewed from the Z-axis direction, and the optical path OP between the mirror surfaces 41a and 42a is inclined at the incident angle $\theta_V$ with respect to the Z-axis direction as shown in FIG. 7, the position P3 overlaps with the position P1 in the Z-axis direction below the position P1. When an optical path length from the reflection point of the incident adjustment mirror 6 to the reflection point of the light guide mirror 7 via the mirror unit 4 is represented by $D_T$, a relationship of "h=$D_T \times \tan \theta_V$" is established.

When the parameters E1 and E2 are defined by the following Expressions (1) and (2), respectively, if the incident angle $\theta_H$ satisfies the condition of the following Expression (3), the outward path OP1 and the return path OP2 between the plane mirrors 41 and 42 when viewed from the Z-axis direction completely overlap with each other and the total optical path length of the optical path OP can be maximized. That is, by adjusting the incident angle $\theta_H$ so as to satisfy the condition of the following Expression (3), the position P2 which is the final arrival point of the outward path OP1 can be brought close to the back end portion 41h (or back end portion 42h) as much as possible, and the number of reflections between the mirror surfaces 41a and the 42a can be maximized.

$$E_1 = \frac{d_1}{2} \sin\left(\frac{\alpha}{2}\right) \tag{1}$$

$$E_2 = E_1 - d_2 \tag{2}$$

$$\theta_H = 2 \sin^{-1}\left(\sqrt{\frac{1 - \frac{E_1}{E_2}}{2}}\right) \tag{3}$$

For example, each of the distances d1, d2, and tilt angle $\alpha$ may be set as follows.

d1=55 mm
d2=150 mm
$\alpha$=0.3°

Figure 8:
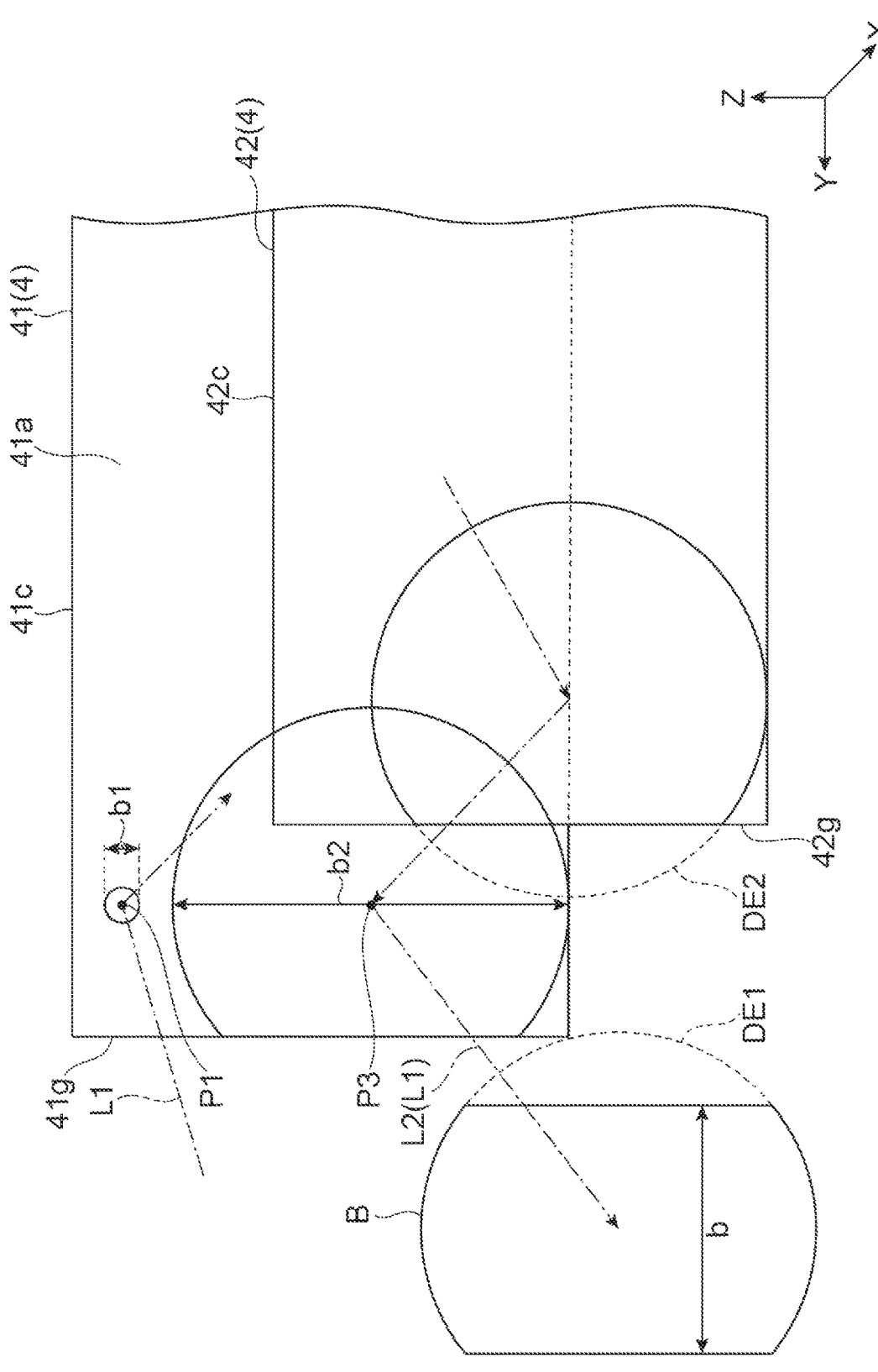
FIG. 8 is a diagram showing a beam shape of a laser beam reaching a light guide mirror.

When d1, d2, and a are set as described above, the incident angle $\theta_H$ that maximizes the total optical path length of the optical path OP is found to be 9.6° based on the above Expressions (1) to (3). In this case, the optical path length of the optical path OP from the position P1 to the position P3 via the turning point (position P2) is approximately 3.5 m. In addition, the incident angle $\theta_V$ is calculated as "$\theta_V = \tan^{-1}(15/3500) = 0.25°$" under the above-described conditions because it is only necessary to adjust the center position of the laser beam L1 so as to be shifted by the distance h (15 mm in this embodiment) in the Z-axis direction after the optical path length of 3.5 in. Here, although the laser beam L1, which is mid-infrared light, is collimated by the lens 11, since the wavelength thereof is longer than that of visible light and near-infrared light, the beam diameter thereof is likely to increase with long-distance propagation. That is, as shown in FIG. 8, the beam diameter b2 of the laser beam L1 (return light L2) which is finally reflected at the position P3 and travels toward the light guide mirror 7 is larger than the beam diameter b1 of the laser beam L1 which is first incident on the position P1. In the combination of the light source unit 2 (DFB-QCL operating in a single mode with a wavelength of 4.6 μm) and the lens 11 (collimating lens with a focal distance of 1 mm) used in the present embodiment, the spread angle of the laser beam L1 (width at the intensity of $1/e^2$ (here, width in the fast direction described later)) accompanying the propagation of the laser beam L1 is 0.280 on one side, and the beam diameter b2 of the laser beam L1 after the propagation of 3.5 m is about 25 mm.

When the beam diameter b2 becomes relatively large as described above, a part of the return light L2 directed from the position P3 to the light guide mirror 7 may be blocked by the plane mirror 42 to cause a beam loss (a missing portion DE1 indicated by a broken line in FIG. 8). In addition, when the return light L2 is reflected by the mirror surface 42a of the plane mirror 42 before traveling toward the position P3, a part of the return light L2 may escape to the outside of the mirror surface 42a, thereby causing a beam loss (a missing portion DE2 indicated by a broken line in FIG. 8). As a result, the beam shape B of the return light L2 finally guided to the light guide mirror 7 may be in a state where both side portions in the Y-axis direction are lost. That is, the width b in the Y-axis direction of the return light L2 having the beam shape B may be smaller than the beam diameter b2.

Figure 9:
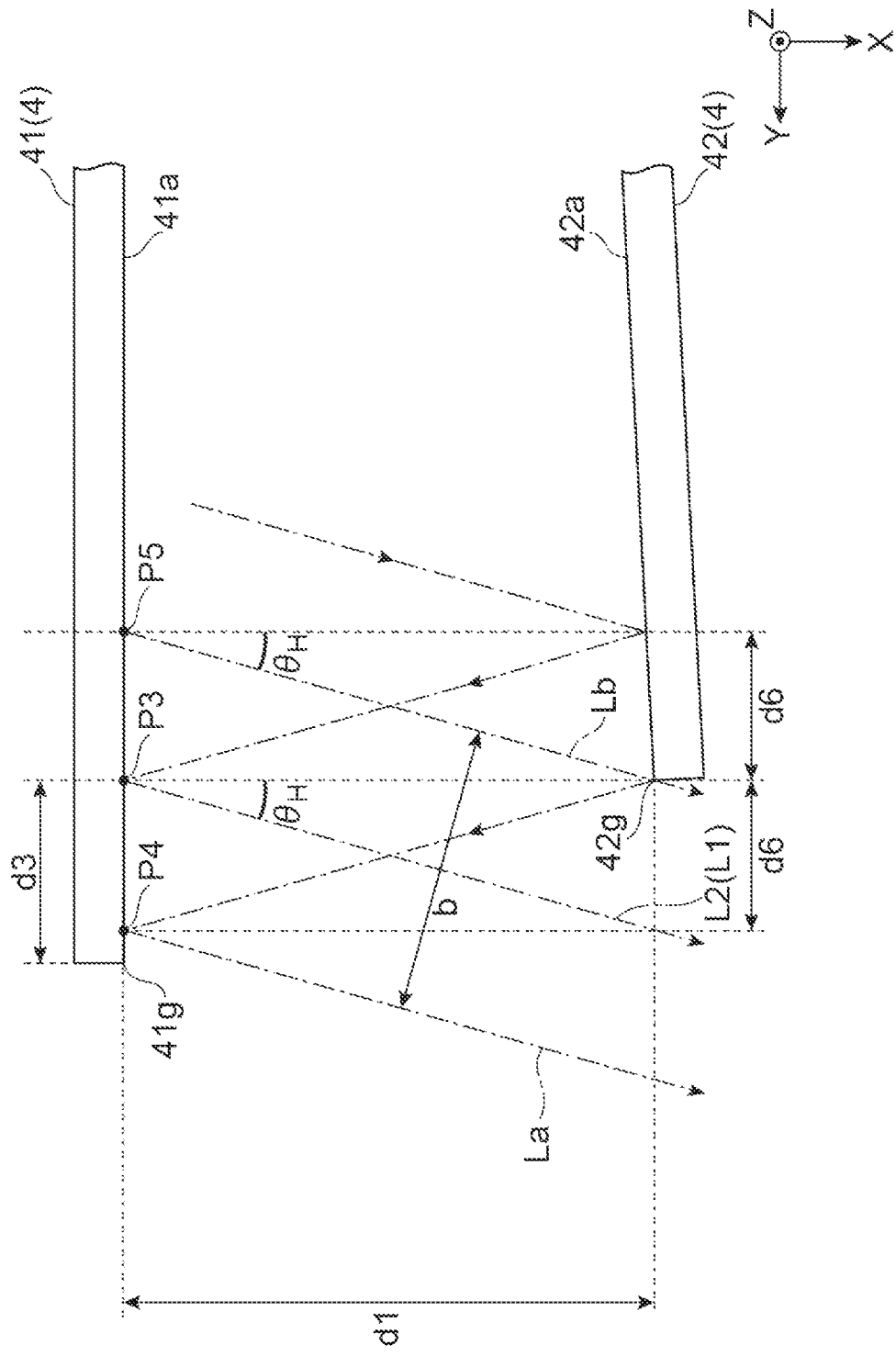
FIG. 9 is a diagram showing a beam diameter of a laser beam reaching a light guide mirror.

Here, in the beam shape B, in order to secure an area of at least half or more of the return light L2 before the loss (i.e., to secure the length b to a half or more of the beam diameter b2), the tilt angle α may be made larger than the spread angle of the laser beam L1 (0.28° in the present embodiment). As shown in FIG. 9, in a case where the distance d3 is long enough, the beam range of the return light L2 returned to the light guide mirror 7 as viewed in the Z-axis direction is from a portion La reflected by the mirror surface 41a after being reflected by the front end portion 42g of the mirror surface 42a to a portion Lb passing through the vicinity of the front end portion 42g of the mirror surface 42a (i.e., a portion directed to the light guide mirror 7 without being blocked by the front end portion 42g). Here, when a position at which the portion La is incident on the mirror surface 41a after being reflected by the front end portion 42g of the mirror surface 42a is referred to as a position P4, a distance d6 along the Y-axis direction between the front end portion 42g and the position P4 is expressed as "d1×tan $\theta_H$". Therefore, from the viewpoint of avoiding the beam loss of the return light L2, it is preferable to set the distances d3 so that the following Expression (4) is satisfied. Further, from the viewpoint of reducing the size of the spectrometer 1A as much as possible (that is, reducing the size of a member (plane mirror 41) constituting the spectrometer 1A) while avoiding the beam loss of the return light L2 described above, it is preferable to set the distance d3 so that the following Expression (5) is satisfied.

$$d3 \geq d1 \times \tan \theta_H \qquad (4)$$

$$d3 = d1 \times \tan \theta_H \qquad (5)$$

In addition, from the viewpoint of miniaturization of the spectrometer 1A, the distance d2 is preferably equal to or less than 300 mm. For the same reason, the length d5 (height) of the plane mirrors 41 and 42 in the Z-axis direction is preferably equal to or less than 50 mm. Here, for example, when the distance d1 is set to be equal to the distance d2, in order to make the optical path OP a long optical path enough for gas measurement while realizing the reciprocating optical path OP that travels in the Y-axis direction while performing zigzag multiple reflection, it may be necessary to make the incident angle $\theta_H$ and the tilt angle α small enough to be difficult to control. In addition, as the incident angle $\theta_H$ and the tilt angle α become smaller, the beam loss (see FIG. 8) of the return light L2 caused by the enlargement of the beam diameter of the laser beam L1 becomes larger. On the other hand, by reducing the ratio of the length d1 to the length d2 to some extent, it becomes easy to lengthen the optical path OP by effectively utilizing the entire mirror unit 4 in the Y-axis direction (depth direction) while increasing the incident angle $\theta_H$ to some extent. From the above-described viewpoint, it is preferable that the distance d1 be set to, for example, one third or less of the distance d2. When the dimensions are set as described above, the volumes of the space to be filled with the gas to be measured (that is, the space between the plane mirrors 41 and 42) can be suppressed to "300 (distance d2)×50 (length d5)×100 (distance d1) mm$^3$" or less at the maximum, and measurement with a small amount of sample gas becomes possible. In the present embodiment, from the viewpoint of avoiding a beam loss of the return light L2 in the Z-axis direction, the length d5 may be, for example, equal to or greater than 30 mm.

Next, a method of manufacturing the spectrometer 1A will be described. As described above, the laser beam L1 emitted from the light source unit 2 and collimated by the lens 11 is incident on the mirror unit 4 and forms the outward path OP1 and the return path OP2 that overlap with each other in the Z-axis direction. Such an optical path OP is established only when the laser beam L1 is incident on the mirror surface 41a at exactly incident angle $\theta_H$. When the positional deviation of the optical path determined by the incident angle $\theta_V$ (that is, the difference between the height position (position in the Z-axis direction) of the laser beam L1 incident on the incident adjustment mirror 6 and the height position of the return light L2 incident on the light guide mirror 7) coincides with the length h in the Z-axis direction between the incident adjustment mirror 6 and the light guide mirror 7, the signal strength (light detection intensity) in the light detector 3 becomes maximum. Based on the above, first, each of the light source unit 2, the light detector 3, the mirror unit 4, and the light guide mirror 7 is fixed. For example, each of the light source unit 2, the light detector 3, the mirror unit 4, and the light guide mirror 7 is positioned and fixed in a position and an orientation designed in advance with respect to the support unit 8. Subsequently, while emitting the laser beam L1 from the light source unit 2, the position and the angle of the incident adjustment mirror 6 are adjusted and fixed so that the signal strength in the light detector 3 becomes maximum. According to such a procedure, after the light source unit 2, the light detector 3, the mirror unit 4, and the light guide mirror 7 are positioned (fixed) in advance within a range of mechanical accuracy, it is possible to perform precise angle adjustment or the like of the incident adjustment mirror 6 based on a relatively simple indicator of maximizing the signal strength in the light detector 3. The above-described method is particularly effective when the laser beam L1 emitted from the light source unit 2 is invisible mid-infrared light as in the present embodiment.

Effects of First Embodiment

According to the spectrometer 1A described above, it is possible to realize a spectrometer 1A having a long optical path by a configuration in which two plane mirrors 41 and 42 are disposed to face each other in a non-parallel manner (that is, a configuration that is inexpensive and simple compared to a configuration of a Herriott cell or the like using a conventional concave mirror). In addition, by setting the optical path OP of the laser beam L1 between the plane mirrors 41 and 42 to be inclined with respect to the Z-axis direction, the outward path OP1 and the return path OP2 of the laser beam L1 between the plane mirrors 41 and 42 can be spatially separated in the Z-axis direction, and thus spectroscopic measurement of the gas introduced between the plane mirrors 41 and 42 can be appropriately performed. More specifically, it is possible to prevent the outward path light (outward path OP1) and the return path light (return path OP2) from interfering with each other between the plane mirrors 41 and 42, to prevent the laser beam L1 (return light L2) returned by the mirror unit 4 from reentering the light source unit 2, and to appropriately guide the return light L2 to the light detector 3. Therefore, according to the spectrometer 1A, simplification (cost reduction) and miniaturization of the device can be achieved.

As described above, according to the spectrometer 1A, it is possible to fold a long optical path in a small space by causing multiple reflection of light using a pair of plane mirrors disposed to face each other in a non-parallel manner. Accordingly, it is possible to realize absorption spectroscopy with high sensitivity by a long optical path with respect to the gas to be measured introduced into the space interposed between the plane mirrors 41 and 42 while employing a compact configuration. In addition, since the plane mirrors 41 and 42 are inexpensive compared to a spherical (concave) mirror used in a general long optical path gas cell, it is possible to suppress the price of the spectroscopic measurement module to be low.

The optical path of the laser beam L1 initially incident on the mirror surface 41a is inclined at the incident angle $\theta_V$ with respect to the Z-axis direction. Further, the mirror surface 41a and the mirror surface 42a are parallel to the Z-axis direction. According to the above configuration, by inclining the optical path of the laser beam L1 initially incident on the mirror surface 41a with respect to the Z-axis direction, it is possible to easily realize a configuration in which the optical path OP of the laser beam L1 between the plane mirrors 41 and 42 is inclined with respect to the Z-axis direction without inclining the plane mirrors 41 and 42 with respect to the Z-axis direction (that is, by simply arranging the plane mirrors 41 and 42 vertically on the support surface 8a).

The incident angle $\theta_H$ of the laser beam L1 initially incident on the mirror surface 41a when viewed from the Z-axis direction with respect to the mirror surface 41a is adjusted to be a natural number multiple of the tilt angle $\alpha$ of the mirror surface 42a with respect to the mirror surface 41a when viewed from the Z-axis direction. According to the configuration described above, the optical path OP of the laser beam L1 between the plane mirrors 41 and 42 can be set such that the outward path OP1 and the return path OP2 of the laser beam L1 between the plane mirrors 41 and 42 overlap with each other when viewed from the Z-axis direction. This makes it possible to easily arrange an outward path optical system (lens 11, window member 13, incident adjustment mirror 6, etc. in the present embodiment) for guiding the laser beam L1 from the light source unit 2 to the mirror unit 4 and a return path optical system (lens 12, window member 14, light guide mirror 7, etc. in the present embodiment) for guiding the return light L2 returned from the mirror unit 4 to the light detector 3.

The distance d2 (see FIG. 5) along the Y-axis direction from a position P1 where the laser beam L1 is first incident on the mirror surface 41a to the back end portion 41h of the mirror surface 41a (that is, an end portion of the mirror surface 41a in the outward direction of the laser beam L1) is equal to or less than 300 mm. According to the above configuration, it is possible to more effectively reduce the size of the device.

The length d5 (see FIG. 7) of the mirror unit 4 (plane mirrors 41 and 42) in the Z-axis direction is equal to or less than 50 mm. According to the above configuration, by suppressing the height of the mirror unit 4 to a certain level or less, it is possible to reduce the size of the device and to suppress the amount of gas introduced (filled) between the plane mirrors 41 and 42 to a certain level or less. That is, only by introducing a relatively small amount of gas between the plane mirrors 41 and 42, it is possible to perform spectroscopic measurement of the gas.

The front end portion 41g of the mirror surface 41a protrudes forward (in the Y-axis positive direction) from the front end portion 42g of the mirror surface 42a. As shown in FIG. 5, in the present embodiment, the front end portion 41g of the mirror surface 41a is located forward of the front end portion 42g of the mirror surface 42a by the distance d3. According to the above configuration, it is possible to make the laser beam L1 easily incident on the mirror surface 41a. In addition, in a case where the beam diameter of the laser beam L1 expands through propagation of a long optical path due to multiple reflection between the plane mirrors 41 and 42, it is possible to suppress the laser beam L1 (return light L2) finally reflected by the mirror surface 41a (position P3) and guided to the light detector 3 side from being blocked by the mirror surface 42a (that is, the beam loss of the return light L2 from occurring).

The distance d3 along the Y-axis direction from the front end portion 42g of the mirror surface 42a to the front end portion 41g of the mirror surface 41a is set to be equal to or greater than a value obtained by multiplying $\tan\theta_H$ by the length d1 along the X-axis direction between the mirror surface 41a and the front end portion 42g of the mirror surface 42a. That is, the distances d3 is set so as to satisfy the above-described Expression (4). According to the above configuration, as shown in FIG. 9, it is possible to avoid the beam loss caused by the return light reflected by the front end portion 42g of the mirror surface 42a and directed toward the mirror surface 41a escaping to the outside (front) of the front end portion 41g of the mirror surface 41a.

Note that in the present embodiment (see, for example, FIGS. 5, 6, and 9), the distance d3 is set longer than the value obtained by multiplying the distances d1 by $\tan\theta_H$, but the distance d3 may be set so as to match the value obtained by multiplying the distance d1 by $\tan\theta_H$. That is, the distance d3 may be set so as to satisfy the above-described Expression (5). In this case, the same effect as in the case where the Expression (4) is satisfied can be obtained, and by setting the projection length of the plane mirror 41 (mirror surface 41a) with respect to the plane mirror 42 (mirror surface 42a) (that is, the distance d3) to be necessary and sufficient to avoid the beam loss, both avoidance of the beam loss and downsizing of the device can be achieved.

The tilt angle $\alpha$ of the mirror surface 42a with respect to the mirror surface 41a is set to be larger than the spread angle of the laser beam L1 passing between the mirror surface 41a and the mirror surface 42a when viewed from the Z-axis direction. According to the above configuration, when the beam diameter of the laser beam L1 expands through propagation of a long optical path due to multiple reflection between the plane mirrors 41 and 42 (see FIG. 8), it is possible to effectively suppress the beam loss of the return light L2. For example, as described above, in the beam shape B (see FIG. 8), it is easy to secure an area of at least a half or more of the return light L2 before the loss (that is, to set the width b in the Y-axis direction of the return light L2 having the beam shape B to a half or more of the beam diameter b2). However, in the beam shape B, it is not essential to secure an area of a half or more of the return light L2 before the loss. For example, in a case where the light detector 3 having a very high light detection ability can be used, the beam shape B does not need to have an area of a half or more of the return light L2 before the loss.

Although it is assumed in the above embodiment (FIG. 8) that the beam diameter of the laser beam L1 is circular, the laser beam L1 emitted from the light source unit 2, which is a quantum cascade laser element, is actually anisotropic with respect to beam spread. More specifically, as shown in FIG. 3, the spread angle (radiation angle) of the laser beam L1 along the direction DF (fast direction) along the stack direction D2 of the active layer is larger than the radiation angle of the laser beam L2 along the direction DS (slow direction) orthogonal to the stack direction D2. The spread angle (0.28° on one side) assumed in the above embodiment is a spread angle along the direction DF. In this way, by making the tilt angle α larger than a larger spread angle (spread angle along the direction DF), it is possible to more reliably suppress or avoid beam loss. In addition, in order to suppress the beam loss in the Y-axis direction as illustrated in FIG. 8, the orientation of the light source unit 2, the position and angle of the incident adjustment mirror 6, and the like may be set such that the direction DS of the laser beam L1 passing between the plane mirrors 41 and 42 is along the Y-axis direction.

The light source unit 2 and the light detector 3 are disposed so as to overlap with each other in the Z-axis direction. By inclining the optical path OP of the laser beam L1 between the plane mirrors 41 and 42 with respect to the Z-axis direction, the optical path of the laser beam L1 guided from the light source unit 2 to the mirror unit 4 and the optical path of the return light L2 guided from the mirror unit 4 to the light detector 3 can be separated in the Z-axis direction. By using this to arrange the light source unit 2 and the light detector 3 side by side in the Z-axis direction, it is possible to reduce areas required for arrangement of the light source unit 2 and the light detector 3 (areas when viewed from the Z-axis direction) can be reduced as compared with a case where the light source unit 2 and the light detector 3 are arranged not overlapping with each other in the Z-axis direction but shifted in the X-axis direction or the Y-axis direction. As a result, the size of the device can be reduced more effectively.

The distance between the lens 11 and the light source unit 2 (quantum cascade laser element) (the distance between the light exit surface 2a and the incident surface 11a) is shorter than the shortest distance between the mirror surface 41a and the mirror surface 42a in the X-axis direction (the distance between the back end portion 41h and the back end portion 42h). According to the above-described configuration, the lens 12 can effectively suppress the spread of the laser beam L1 emitted from the light source unit 2. That is, the beam diameter of the laser beam L1 can be made sufficiently small. As a result, the spread of the beam diameter of the laser beam L1 between the plane mirrors 41 and 42 can be suppressed, and the beam loss of the return light L2 caused by the spread of the beam diameter can be reduced.

The spectrometer 1A includes the incident adjustment mirror 6 and the light guide mirror 7. The incident adjustment mirror 6 and the light guide mirror 7 are disposed so as to overlap with each other in the Z-axis direction. According to the above configuration, by using the incident adjustment mirror 6 and the light guide mirror 7, it is possible to improve the flexibility of the arrangement (layout) of the light source unit 2 and the light detector 3 with respect to the mirror unit 4. For example, as in the present embodiment, the housing 10 that houses the light source unit 2 and the light detector 3 can be compactly disposed on the side of the mirror unit 4. In addition, by arranging the incident adjustment mirror 6 and the light guide mirror 7 side by side in the Z-axis direction, it is possible to reduce an area necessary for arranging the incident adjustment mirror 6 and the light guide mirror 7 (an area when viewed from the Z-axis direction) compared to a case in which the incident adjustment mirror 6 and the light guide mirror 7 are arranged without overlapping with each other in the Z-axis direction, and it is also possible to achieve miniaturization of the device.

Second Embodiment

The spectrometer 1B of the second embodiment will be described with reference to FIG. 10. The spectrometer 1B is mainly different from the spectrometer 1A in that the spectrometer 1B includes a combination (system) of a plurality of (for example, two) light sources (light source unit 2) and light detectors (light detector 3) and is configured to simultaneously perform spectroscopic measurement of a gas introduced between the plane mirrors 41 and 42 in a plurality of systems. The configuration of the second embodiment can be easily realized by employing a plane mirror pair (mirror unit 4) as a configuration for realizing a long optical path.

Figure 10:
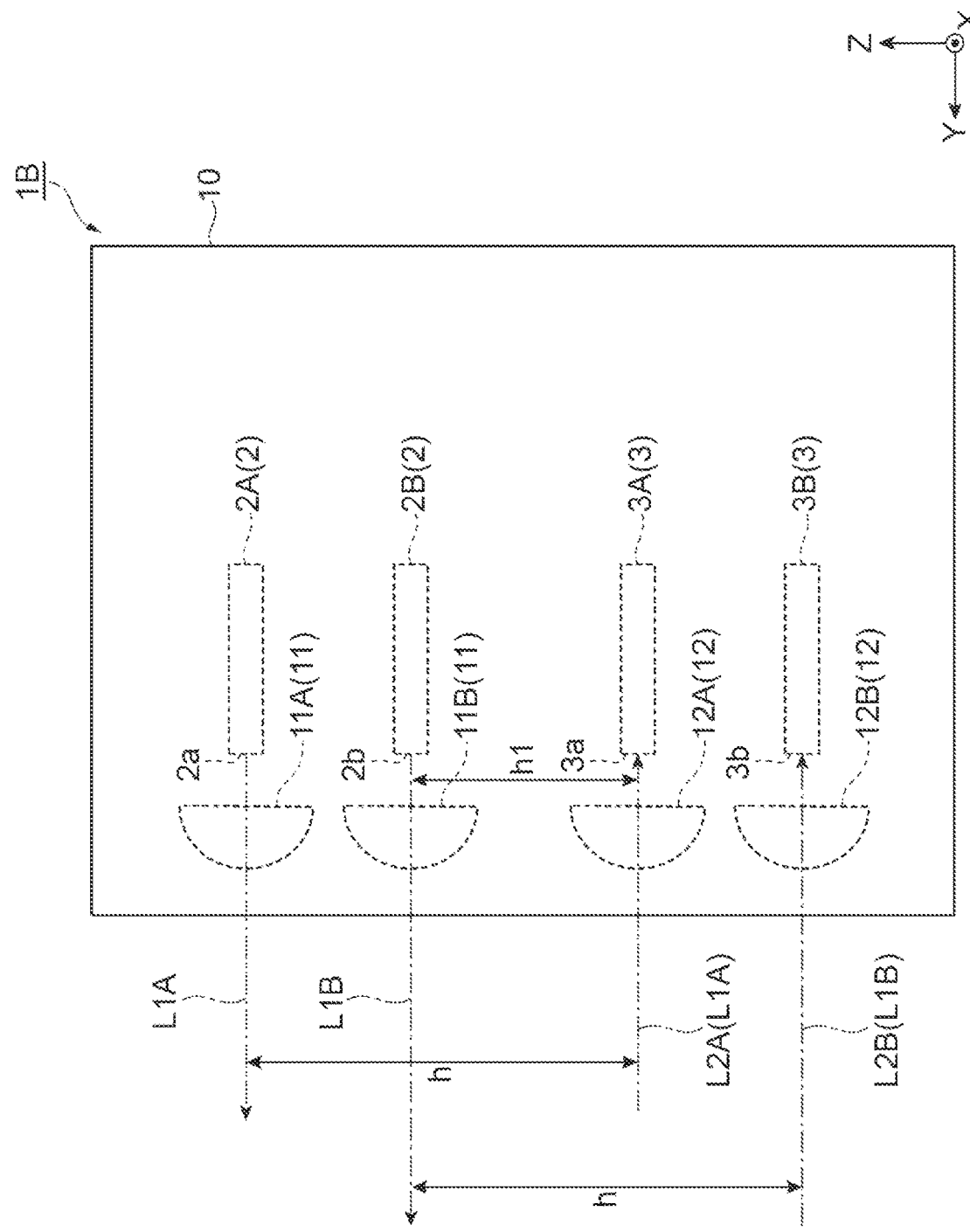
FIG. 10 is a diagram showing a part of the configuration of the spectrometer of the second embodiment.

In the example of FIG. 10, the light source unit 2 includes a light source unit 2A (first light source unit) that emits a laser beam L1A of a first wavelength (for example, oscillation wavelength of 6 µm), and a light source unit 2B (second light source unit) that emits a laser beam L1B of a second wavelength different from the first wavelength (for example, oscillation wavelength of 4 µm). In addition, the light detector 3 includes a light detector 3A (first light detector) that detects the laser beam L1A (return light L2A) of the first wavelength that is reflected and returned by multiple reflection between the mirror surfaces 41a and 42a, and a light detector 3B (second light detector) that detects the laser beam L1B (return light L2B) of the second wavelength that is reflected and returned by multiple reflection between the mirror surfaces 41a and 42a. The light source unit 2A, the light source unit 2B, the light detector 3A, and the light detector 3B are disposed so as to overlap with each other in the Z-axis direction.

Similar to the first embodiment, each of the light source units 2A and 2B may be configured by a quantum cascade laser element (DFB-QCL). In addition, each of the light detectors 3A and 3B may be configured by a quantum cascade photodetector having a characteristic (for example, a sensitive wavelength) corresponding to that of each of the light source units 2A and 2B.

In the spectrometer 1B, an optical path of a first system corresponding to a combination of the light source unit 2A and the light detector 3A (i.e., an optical path incident on the mirror unit 4 via the incident adjustment mirror 6 from the light source unit 2A and guided to the light detector 3A via the light guide mirror 7 after being returned by the mirror unit 4) and an optical path of a second system corresponding to a combination of the light source unit 2B and the light detector 3B (i.e., an optical path incident on the mirror unit 4 via the incident adjustment mirror 6 from the light source unit 2B and guided to the light detector 3B via the light guide mirror 7 after being returned by the mirror unit 4) are simultaneously formed.

In addition, the spectrometer 1B includes a lens 11A corresponding to the light source unit 2A, a lens 11B corresponding to the light source unit 2B, a lens 12A corresponding to the light detector 3A, and a lens 12B corresponding to the light detector 3B. Each lens is disposed in front of its corresponding member.

The optical axis of the light source unit 2A (the axial line passing through the center of the light exit surface 2a of the light source unit 2A) and the optical axis of the light detector 3A (the axial line passing through the center of the light detection surface 3a of the light detector 3A) are separated from each other by a distance "h" in the Z-axis direction. Similarly, the optical axis of the light source unit 2B (the axial line passing through the center of the light exit surface 2b of the light source unit 2B) and the optical axis of the light detector 3B (the axial line passing through the center of the light detection surface 3b of the light detector 3B) are separated from each other by a distance "h" in the Z-axis direction. The light source unit 2B is disposed between the light source unit 2A and the light detector 3A. The light detector 3A is disposed between the light source unit 2B and the light detector 3B. The optical axis of the light source unit 2B and the optical axis of the light detector 3A are separated from each other by a distance "h1" in the Z-axis direction. Therefore, in the spectrometer 1B, the interval between the light source unit (light source unit 2A) positioned at the uppermost stage and the light detector (light detector 3B) positioned at the lowermost stage is longer than the interval "h" in the spectrometer 1A by "h−h1".

The mirror unit 4, the incident adjustment mirror 6, and the light guide mirror 7 in the second embodiment can be commonly used for the above two systems. That is, the mirror unit 4, the incident adjustment mirror 6, and the light guide mirror 7 do not need to be individually provided for each system. Accordingly, the configurations of the mirror unit 4, the incident adjustment mirror 6, and the light guide mirror 7 in the second embodiment are similar to those in the first embodiment. However, in the second embodiment, since it is necessary to form two systems of optical paths whose positions are shifted from each other in the Z-axis direction, it is necessary to make the dimensions of the mirror unit 4, the incident adjustment mirror 6, and the light guide mirror 7 larger than the dimensions of the first embodiment by that amount. For example, since the shift amount of the optical path in the Z-axis direction is increased by "h−h1" compared to the first embodiment, the length d5 of the mirror unit 4 may be increased by "h−h1" compared to the first embodiment. In addition, the incident adjustment mirror 6 and the light guide mirror 7 may have a shape and a size capable of simultaneously reflecting the optical paths of the two systems.

By configuring the mirror unit 4, the incident adjustment mirror 6, and the light guide mirror 7 as described above, the optical path of the first system and the optical path of the second system are only shifted in the Z-axis direction and completely match when viewed from the Z-axis direction, and the total optical path length of each optical path also matches.

According to the spectrometer 1B, by arranging the light source unit 2A, the light source unit 2B, the light detector 3A, and the light detector 3B so as to overlap with each other in the Z-axis direction, it is possible to compactly arrange the light sources and detectors of the two systems. In addition, by making the wavelength band different between the two systems, it is possible to simultaneously perform absorption spectroscopic measurement of two wavelength bands different from each other. In the present embodiment, the optical path of the first system (wavelength of 4.6 μm) makes it possible to suitably perform absorption spectroscopy of CO, $N_2O$, or the like. The optical path of the second system (wavelength of 7.4 μm) makes it possible to suitably perform absorption spectroscopy of $CH_4$ or the like.

As described above, a configuration capable of simultaneously performing absorption spectroscopic measurements of a plurality of systems can be easily realized by using the plane mirrors 41 and 42 arranged to face each other in a non-parallel manner. On the other hand, in a method such as a Herriott cell using a concave mirror or a cavity ring-down spectroscopy, a complicated optical system is necessary, and thus it is not easy to realize a configuration in which absorption spectrometry of a plurality of systems is simultaneously performed as in this embodiment.

When sensitive wavelengths overlap between two systems, the light source units 2A and 2B and the light detectors 3A and 3B may be arranged such that the polarization directions are orthogonal to each other between the systems, thereby preventing the measurements in the systems from affecting each other. Further, an optical filter that passes only a wavelength range to be measured may be disposed in the optical path of each system. Further, the order in which the light source units 2 and the light detectors 3 of the plurality of systems are arranged in the Z-axis direction and the intervals between the members are not limited to the form illustrated in FIG. 10. In addition, the spectrometer 1B may include a combination of three or more light source units 2 and light detectors 3.

Third Embodiment

The spectrometer 1C of the third embodiment will be described with reference to FIGS. 11 and 12. The spectrometer 1C is similar to the second embodiment in that it includes a combination of multiple (e.g., two) light sources (light source units 2A and 2B) and light detectors 3A and 3B, but is different from the second embodiment in that the light source units 2A and 2B are arranged side by side in the X-axis direction instead of the Z-axis direction, that the light detectors 2A and 2B are arranged side by side in the X-axis direction instead of the Z-axis direction, that one lens 11C is used in common for the light source units 2A and 2B, and that one lens 12C is used in common for the light detectors 3A and 3B. In addition, in the spectrometer 1C, since the light exit surface 2a of the light source unit 2a and the light exit surface 2b of the light source unit 2B are shifted not in the Z-axis direction but in the X-axis direction, the optical paths of the respective systems do not coincide with each other when viewed from the Z-axis direction.

That is, in the spectrometer 1C, the light source unit 2A and the light source unit 2B are arranged side by side in the X-axis direction, and the light detector 3A and the light detector 3B are arranged side by side in the X-axis direction. In addition, the combinations of first system (light source unit 2A and light detector 3A) are disposed so as to overlap with each other in the Z-axis direction, and the combinations of second system (light source unit 2B and light detector 3B) are disposed so as to overlap with each other in the Z-axis direction.

For example, one light source unit 2A may be disposed such that an optical path passing through a center of the lens 11C and an optical path of the light source unit 2A (a center of the light exit surface 2a) coincide with each other. The other light source unit 2B is arranged parallel to the light source unit 2A at a position slightly shifted in the X-axis direction with respect to the light source unit 2A at the same height position as the light source unit 2A. The light exit points of the light source units 2A and 2B (the centers of the light exit surfaces 2a and 2b, respectively) are disposed on the focal plane of the lens 11C. The interval between the optical axis of the light source unit 2A and the optical axis of the light source unit 2B in the X-axis direction is set to, for example, about 0.5 mm. The light detectors 3A and 3B are also arranged such that the positional relationship between the light detectors 3A and 3B when viewed from the Z-axis direction is the same as the positional relationship between the light source units 2A and 2B when viewed from the Z-axis direction.

Figure 11:
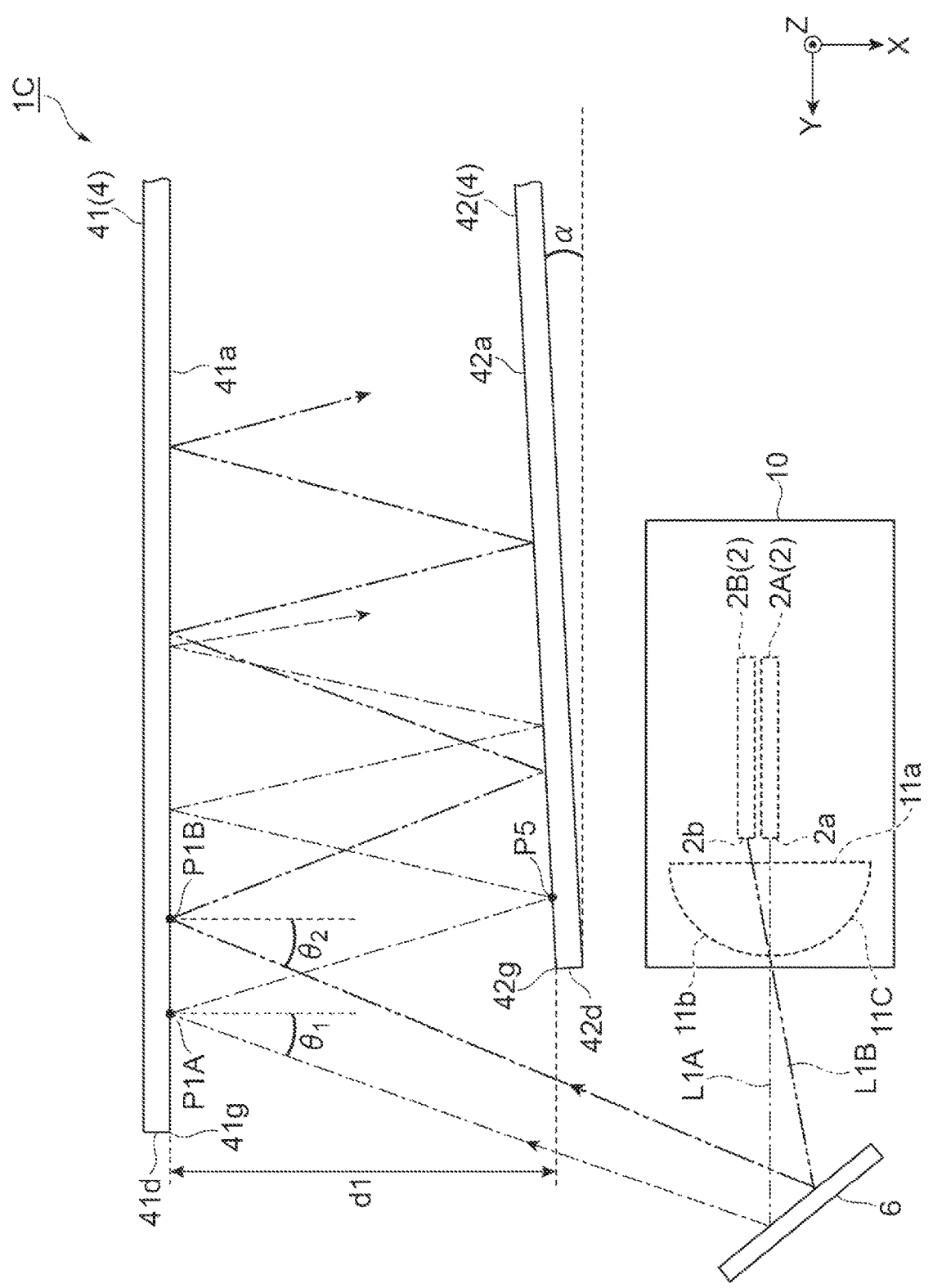
FIG. 11 is a plan view schematically showing an optical system related to a laser beam before being returned by a mirror unit in the configuration of the spectrometer of the third embodiment.

As shown in FIG. 11, a lens having a longer focal distance and a larger lens diameter than those of the lens 11 of the first embodiment is used as the lens 11C. For example, the focal distance of the lens 11C is 5 mm and the lens diameter of the lens 11C is 15 mm. In addition, as shown in FIG. 12, like the lens 11C, the lens 12C has a longer focal distance and a larger lens diameter than those of the lens 12 of the first embodiment. For example, the focal distance of the lens 12C is 5 mm and the lens diameter of the lens 12C is 15 mm.

Figure 12:
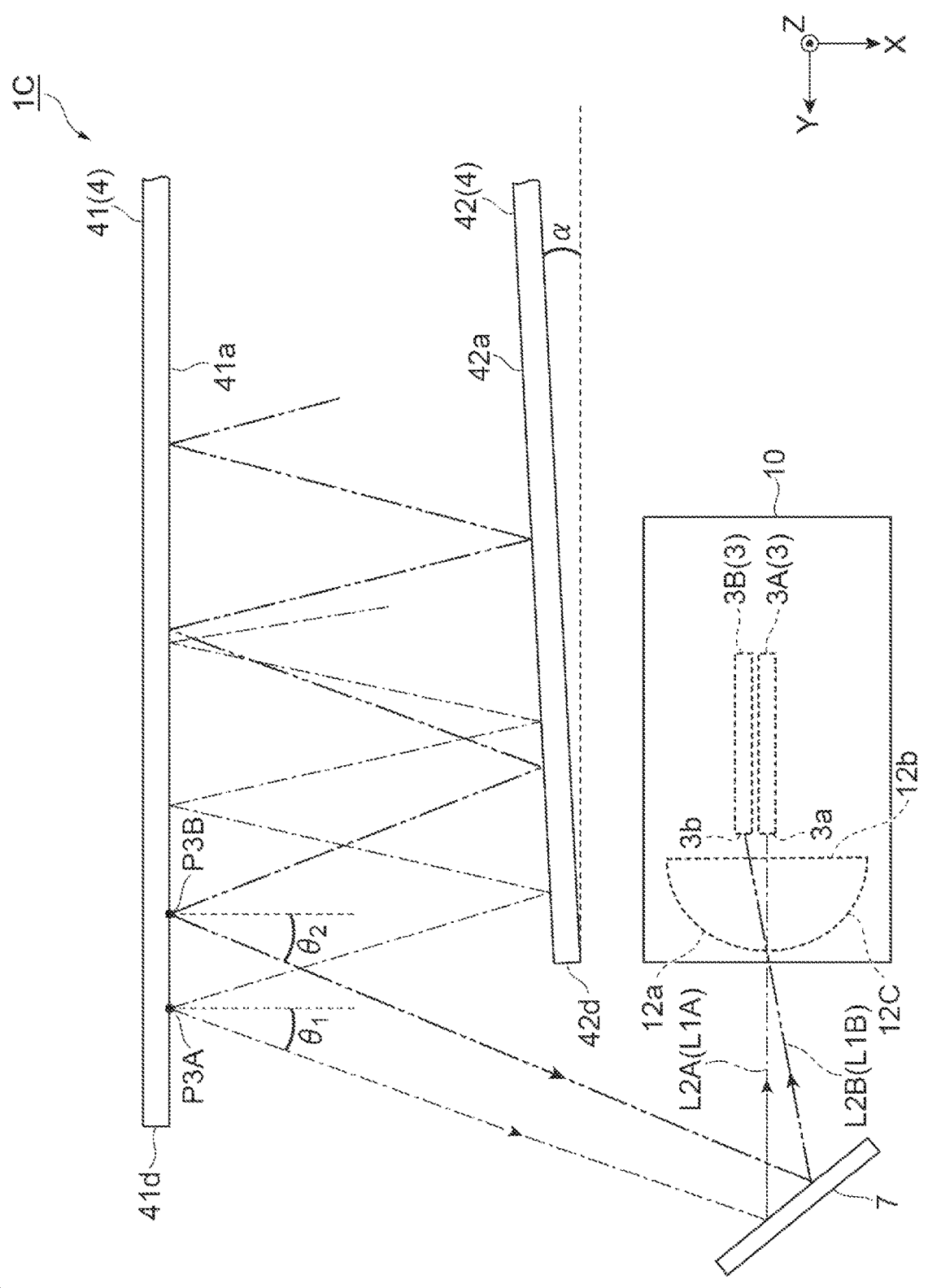
FIG. 12 is a plan view schematically showing an optical system related to a laser beam after being returned by a mirror unit in the configuration of the spectrometer of the third embodiment.

As shown in FIGS. 11 and 12, in the first system, the laser beam L1A emitted from the light exit surface 2a of the light source unit 2A and collimated by the lens 11C is reflected by the incident adjustment mirror 6, then enters the position P1A of the mirror surface 41a of the plane mirror 41 at an incident angle $\theta_1$ when viewed from the Z-axis direction, and travels rearward (in the Y-axis negative direction) while being multiply reflected between the mirror surfaces 41a and 42a. The laser beam L1A (return light L2A) that is returned by the mirror unit 4 and travels forward (in the Y-axis positive direction) is finally reflected at the position P3A of the mirror surface 41a and reaches the light detection surface 3a of the light detector 3A via the light guide mirror 7 and the lens 12C.

On the other hand, in the second system, the laser beam L2A emitted from the light exit surface 2b of the light source unit 2B and collimated by the lens 11C is reflected by the incident adjustment mirror 6, then enters the position P1B of the mirror surface 41a of the plane mirror 41 at an incident angle $\theta_2$ different from the incident angle $\theta_1$ when viewed from the Z-axis direction, and travels rearward (in the Y-axis negative direction) while being multiply reflected between the mirror surfaces 41a and 42a. The laser beam L1B (return light L2B) that is returned by the mirror unit 4 and travels forward (in the Y-axis positive direction) is finally reflected at the position P3B of the mirror surface 41a and reaches the light detection surface 3b of the light detector 3B via the light guide mirror 7 and the lens 12C.

A laser beam emitted from a light source disposed at a focal plane of the lens 11C toward the incident surface 11a of the lens 11C is collimated and propagates in a direction passing through a center of the lens 11C. Therefore, as shown in FIG. 11, when viewed from the Z-axis direction, the optical path of the laser beam L1B emitted from the light source unit 2B is inclined with respect to the optical path of the laser beam L1A emitted from the light source unit 2A by "$\tan^{-1}$ (0.5 mm/5 mm)=5.7°". Therefore, the incident angle $\theta_1$ of the first system is smaller than the incident angle $\theta_2$ of the second system by 5.7°. For example, as in the first embodiment, a case where the distances d1 and d2 (see FIG. 5) are set to 55 mm and 150 mm, respectively, and the tilt angle $\alpha$ is set to 0.30 is considered. In addition, for example, a case where the incident angle $\theta_2$ is adjusted so that the optical path of the laser beam L1B of the second system becomes the longest (that is, so as to satisfy Expression (3) in the first embodiment) will be considered. In this case, the incident angle $\theta_2$ is calculated to be 9.6° similarly to $\theta_H$ in the first embodiment, and the incident angle $\theta_1$ is 3.9°. Here, both incident angles $\theta_1$ and $\theta_2$ are natural number multiples of the tilt angle $\alpha$. Therefore, an outward path (laser beam L1A shown in FIG. 11) and a return path (return light L2A shown in FIG. 12) of the first system coincide with each other when viewed from the Z-axis direction. Similarly, an outward path (laser beam L1B shown in FIG. 11) and a return path (return light L2B shown in FIG. 12) of the second system coincide with each other when viewed from the Z-axis direction.

According to the spectrometer 1C, the light source unit 2A and the light detector 3A are disposed so as to overlap with each other in the Z-axis direction, and the light source unit 2B and the light detector 3B are disposed so as to overlap with each other in the Z-axis direction. Thus, it is possible to compactly dispose the light source units and the light detectors of the two systems. In addition, similarly to the second embodiment, it is possible to simultaneously perform absorption spectroscopy of two different wavebands by making the wavebands different between the two systems. In addition, since one lens 11C can be shared by a plurality of light source units 2A and 2B and one lens 12C can be shared by a plurality of light detectors 3A and 3B, it is possible to reduce the size of the device while realizing a configuration in which measurement of a plurality of systems is performed simultaneously.

The optical path lengths of the laser beam L1A and the laser L1B between the plane mirrors 41 and 42 depend on the incident angles $\theta_1$ and $\theta_2$, respectively. In the above example, the optical path length of the laser beam L1A and L1B between the plane mirrors 41 and 42 are 1.4 m and 3.5 m, respectively. For example, when absorption spectroscopy is performed on gases in a plurality of wavebands using the spectrometer 1C, an optical path of a system having an oscillation wavelength corresponding to a gas having a large absorption coefficient may be set to an optical path having a shorter optical path length, and an optical path of a system having an oscillation wavelength corresponding to a gas having a small absorption coefficient may be set to an optical path having a longer optical path length. According to the above configuration, the optical path length of each system can be appropriately adjusted in accordance with the absorption coefficient of the gas to be measured. Further, in the spectrometer 1C, the lens 11C having a longer focal distance than that in the spectrometer 1A is used, but by using such a lens 11C having a longer focal distance, it is possible to suppress the spread of the beam in the long-distance propagation, and thus it is possible to suppress the beam loss caused by the beam spread as illustrated in FIG. 8.

In addition, the front end portion 42g of the plane mirror 42 may be set to be positioned between the position P1A and the position P1B of the plane mirror 41 in the Y-axis direction. As a result, the beam loss of the laser beam of one optical path can be prevented from becoming extremely large. In addition, the interval between the front end portion 41g of the plane mirror 41 and the position P1A may be set to be equal to or longer than the interval along the Y-axis direction between the position P5 at which the laser beam L1A is first reflected by the mirror surface 42a and the position P1A. In addition, the spectrometer 1C may have a combination of three or more light source units 2 and light detectors 3 like the spectrometer 1B.

Fourth Embodiment

Figure 13:
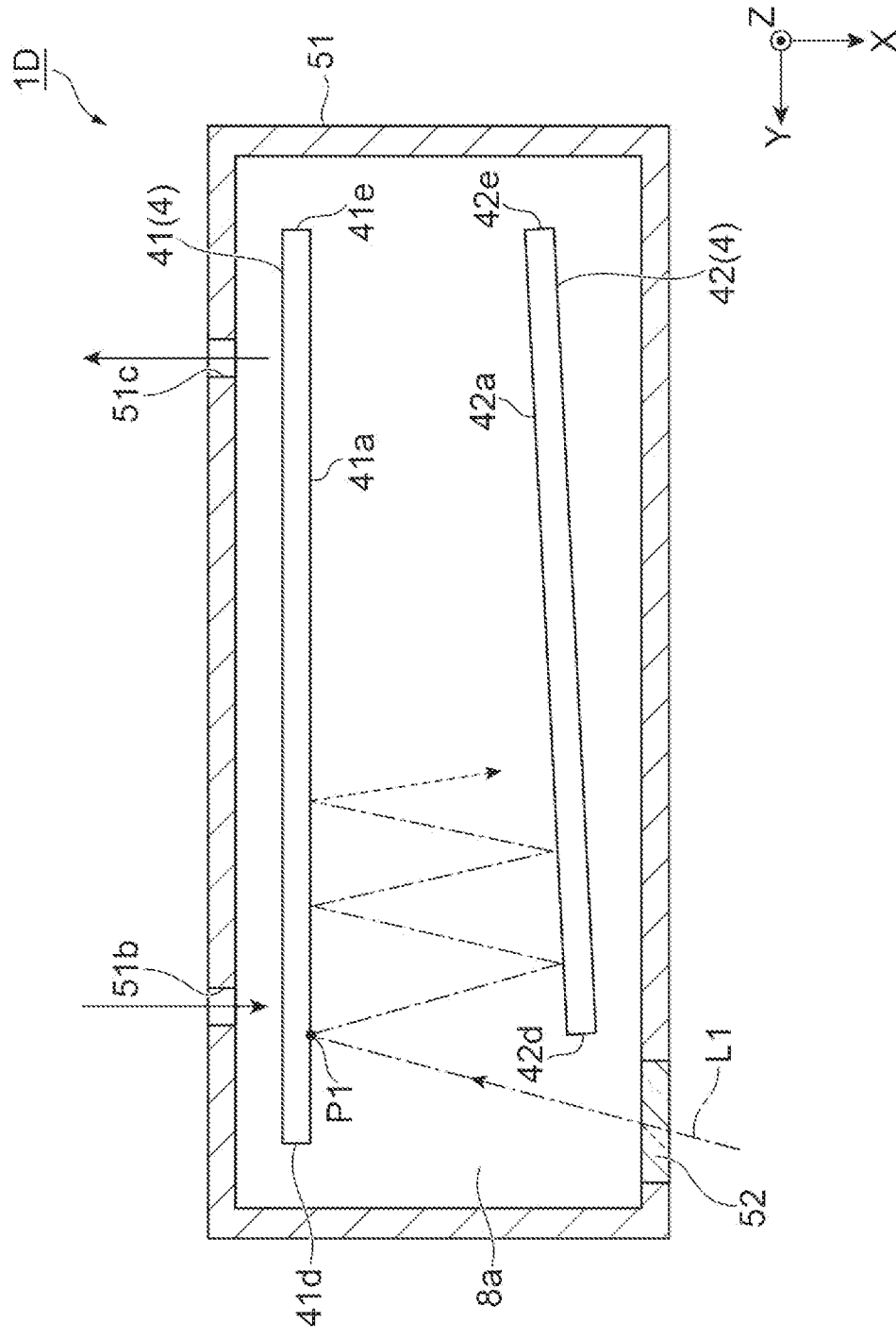
FIG. 13 is a diagram showing a part of the configuration of the spectrometer of the fourth embodiment.

The spectrometer 1D of the fourth embodiment will be described with reference to FIG. 13. The spectrometer 1D is different from the spectrometer 1A in that it includes a housing 51 that airtightly accommodates the mirror unit 4. Other configurations of the spectrometer 1D are the same as those of the spectrometer 1A. FIG. 13 illustrates only a housing 51 in which the mirror unit 4 is accommodated in the spectrometer 1D. In the example of FIG. 13, the housing 51 is configured by a side wall (a portion illustrated by hatching in FIG. 13) erected so as to surround the periphery of the mirror unit 4 on the support surface 8a of the support unit 8 (see FIG. 1) and a top wall (not illustrated) provided so as to close the upper end portion of the side wall. That is, the housing 51 airtightly surrounds only the mirror unit 4 on the support surface 8a.

In the spectrometer 1D, the housing 10 in which the light source unit 2 and the light detector 3 are accommodated is disposed on the side of the housing 51. In other words, the light source unit 2 and the light detector 3 are disposed outside the housing 51. In the present embodiment, the housing 10 that houses the light source unit 2 and the light detector 3, the incident adjustment mirror 6, and the light guide mirror 7 are disposed outside the housing 51 in the same manner as the spectrometer 1A.

The side wall of the housing 51 is provided with a gas inlet 51b (opening) for introducing a gas to be measured from the outside of the housing 51 to the inside of the housing 51. In addition, a gas exhaust port 51c for discharging the gas filled in the housing 51 to the outside of the housing 51 is provided on the side wall of the housing 51. The position, shape, and sizes of the gas inlet 51b and the gas exhaust port 51c are not particularly limited. The gas inlet 51b and the gas exhaust port 51c have functions of maintaining pressures inside the housing 51 and replacing gases inside the housing 51. As shown in FIG. 13, in order to realize efficient gas replacement, it is preferable that the gas inlet 51b and the gas exhaust port 51c are disposed at positions close to both end portions in the longitudinal direction of the housing 51 so as to be sufficiently spaced apart from each other in the longitudinal direction (Y-axis direction) of the housing 51.

In addition, a light transmission window 52 that transmits the laser beam L1 guided from the incident adjustment mirror 6 to the mirror surface 41a (position P1) is provided in a portion facing the position P1 of the mirror surface 41a without being blocked by the plane mirror 42 in the side wall of the housing 51. The light transmission window 52 may be formed of, for example, CaF2, ZnSe, or the like. In addition, a low reflection coating similar to that of the window members 13 and 14 of the first embodiment may be applied to an inner surface (a surface facing the inside of the housing 51) and an outer surface (a surface facing the outside of the housing 51) of the light transmission window 52. Alternatively, the low-reflection coating may be omitted by adjusting the incident angle of the laser beam L1 with respect to the light transmission window 52 to be the Brewster's angle. Similarly, a light transmission window (not shown) that transmits the return light L2 that is reflected by the mirror surface 41a (position P3) and travels toward the light guide mirror 7 is provided in a portion of the side wall of the housing 51 that faces the position P3 (see FIG. 1) of the mirror surface 41a without being blocked by the plane mirror 42. The configuration of the light transmission window for transmitting the return light L2 is similar to the configuration of the light transmission window 52 described above.

According to the spectrometer 1D, by providing the housing 51 that airtightly accommodates only the mirror unit 4, it is possible to perform more precise measurement by reducing the pressure inside the housing 51 and introducing gas from the gas inlet 51b. More specifically, since the absorption line of the gas introduced into the housing 51 is narrowed by depressurizing the inside of the housing 51, it is possible to perform the measurement while avoiding the influence of the interference gas. Further, by airtightly housing only the mirror unit 4 in the housing 51, it becomes easy to apply a highly accurate measurement method such as phase sensitive detection.

Fifth Embodiment

Figure 14:
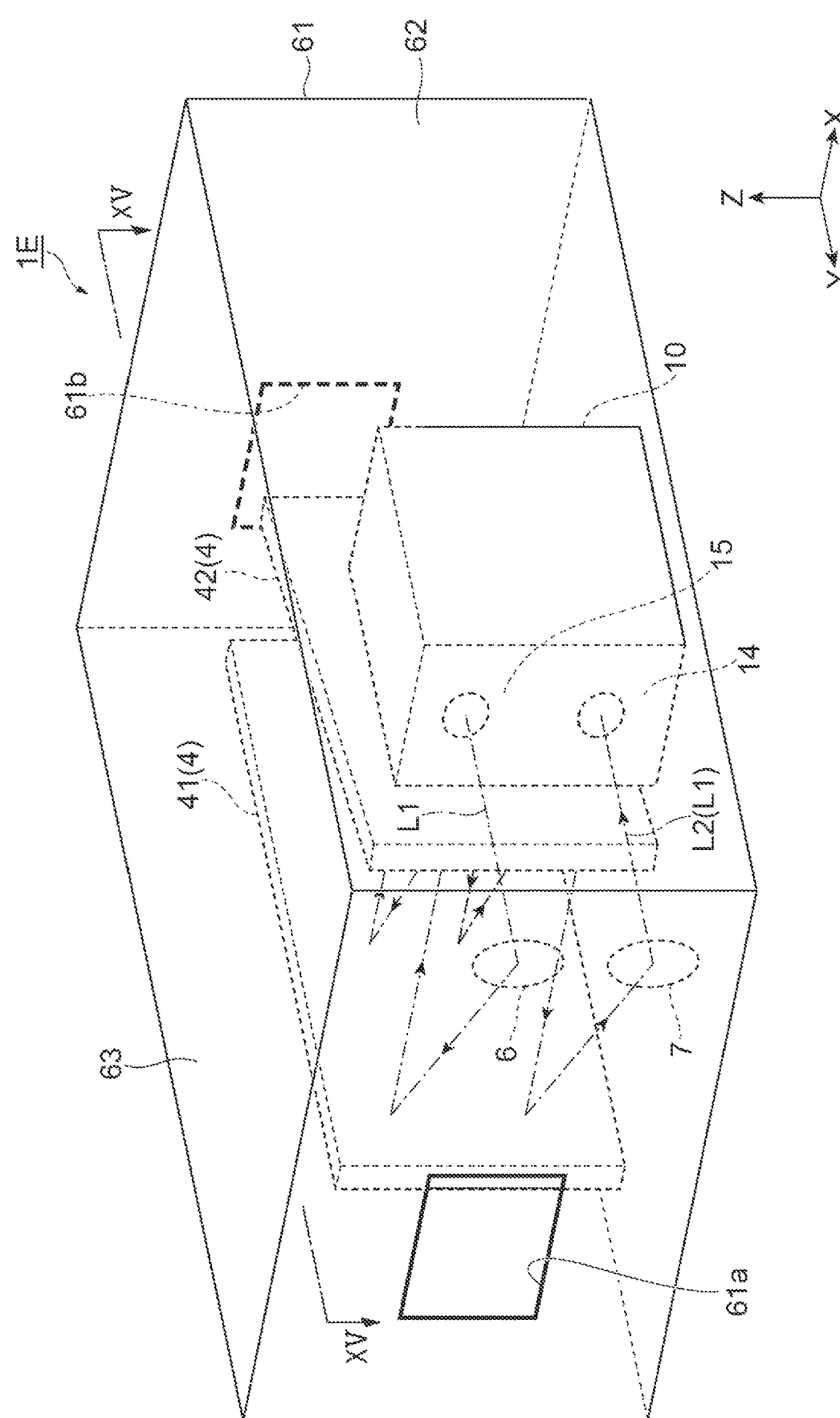
FIG. 14 is a schematic perspective view of a spectrometer of a fifth embodiment.
Figure 15:
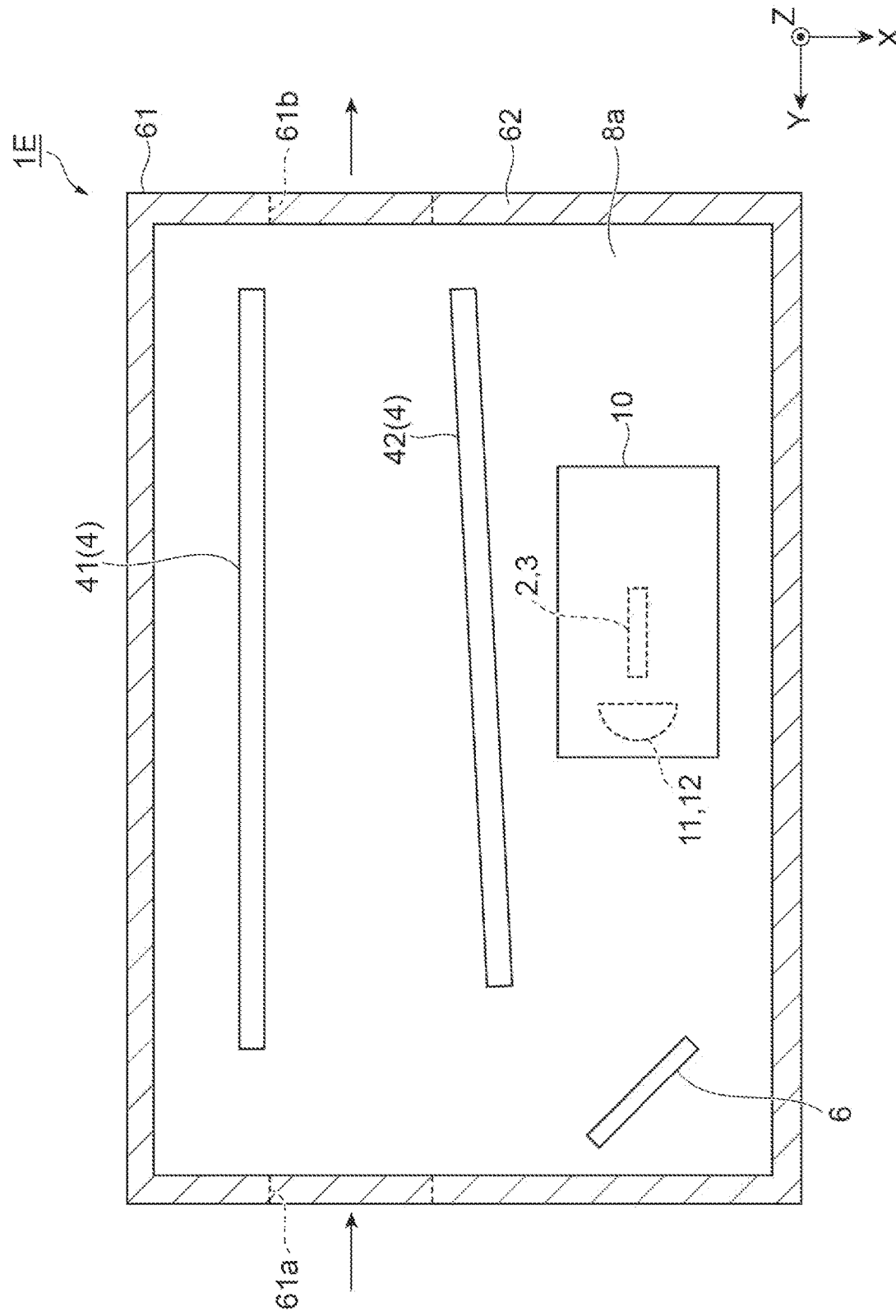
FIG. 15 is a schematic cross-sectional view taken along line XV-XV of FIG. 14.

A spectrometer 1E of a fifth embodiment will be described with reference to FIGS. 14 and 15. The spectrometer 1E is different from the spectrometer 1A in that the spectrometer 1E includes a housing 61 that accommodates the light source unit 2, the light detector 3, and the mirror unit 4. In the present embodiment, the housing 61 of the spectrometer 1E is formed in a rectangular parallelepiped shape by a support unit 8 (see FIG. 1) as a bottom wall of the housing 61, a side wall 62 erected on a peripheral edge portion of the support surface 8a of the support unit 8, and a top wall 63 closing an upper end portion of the side wall 62. Configurations of the housing 10 (light source unit 2 and light detector 3), the mirror unit 4, the incident adjustment mirror 6, and the light guide mirror 7 disposed inside the housing 61 are the same as those of the spectrometer 1A.

The housing 61 may be formed of a material capable of protecting the internal structure and maintaining the shape, such as metal or plastic. In the present embodiment, the bottom wall of the housing 61 also serves as the base member (support unit 8) that supports the constituent members. However, the support unit 8 may be configured as a separate member from the bottom wall of the housing 61. In that case, the support unit 8 may be fixed on the bottom wall of the housing 61, for example.

The housing 61 is provided with vents 61a and 61b (openings) for introducing a gas to be measured from the outside of the housing 61 to the inside of the housing 61. In the present embodiment, as an example, two vents 61a and 61b are provided in each of wall portions (wall portions facing each other in the Y-axis direction in the present embodiment) facing each other in the side wall 62. However, the number, position, size, and shape of vents provided in the housing 61 are not limited to the above example. The number, position, size, and shape of vents can be arbitrarily designed as long as the strength of the housing 61 is not significantly impaired. For example, one vent may be provided in the top wall 63. Further, it is preferable that portions of the housing 61 other than the vents 61a and 61b have airtightness. Further, the housing 61 may be provided with an exhaust or intake fan or the like for replacing the gas inside the housing 61. In addition, the vents 61a and 61b may be provided with dust-proof filters for preventing dust or the like from entering the housing 61 from the outside.

According to the spectrometer 1E, by accommodating the light source unit 2, the light detector 3, and the mirror unit 4 in one housing 61, each member constituting the spectrometer 1E can be appropriately protected from external contamination, mechanical impact, or the like.

Sixth Embodiment

Figure 16:
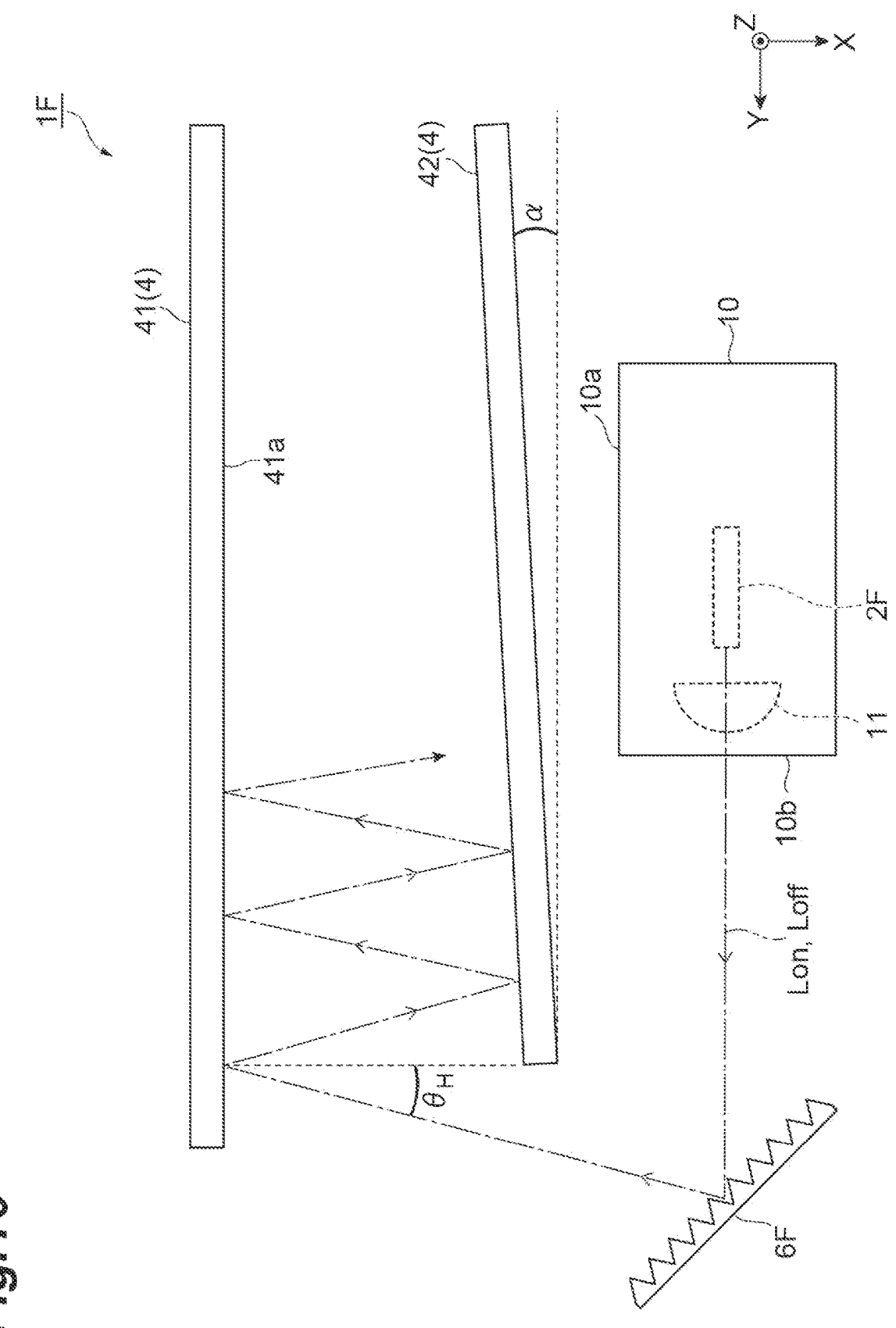
FIG. 16 is a plan view schematically showing the configuration of the spectrometer of a sixth embodiment.

A spectrometer 1F of a sixth embodiment will be described with reference to FIG. 16. The spectrometer 1F is different from the spectrometer 1A in that a light source unit 2F is provided instead of the light source unit 2 and a diffraction grating 6F is provided instead of the incident adjustment mirror 6.

The light source unit 2F is configured to be able to emit a laser beam $L_{on}$ having wavelength $\lambda_{on}$ (first wavelength) and a laser beam $L_{off}$ having wavelength $\lambda_{off}$ (second wavelength) different from the wavelength $\lambda_{on}$. The degree to which the laser beam $L_{on}$ is absorbed by the measurement target gas introduced between the plane mirrors 41 and 42 is higher than the degree to which the laser beam $L_{off}$ is absorbed by the gas. For example, the wavelength $\lambda_{on}$ is a wavelength that is absorbed by the gas to be measured (for example, a wavelength corresponding to an absorption band of the gas), and the wavelength $\lambda_{off}$ is a wavelength at which absorption by the gas to be measured is smaller than the wavelength $\lambda_{on}$ (for example, a wavelength outside the absorption band of the gas). The light source unit 2F may be configured by, for example, a distributed feedback quantum cascade laser element (DFB-QCL) similar to the light source unit 2. The light source unit 2F is configured to be wavelength-swept in a range of wavelengths including at least wavelengths $\lambda_{on}$ and $\lambda_{off}$ by changing the amount of current injected into the light source unit 2F. As described above, in the present embodiment, the light source unit 2F is configured to be capable of emitting light by switching between the laser beam $L_{on}$ and the laser beam $L_{off}$ based on the light emitted from the single quantum cascade laser element (in the present embodiment, DFB-QCL). That is, the spectrometer 1F does not require a plurality of laser elements as a light source, and realizes a configuration in which the laser beam $L_{on}$ and the laser beam $L_{off}$ are switched and emitted by controlling wavelength of light emitted from a single laser element (light source unit 2F in the present embodiment).

The diffraction grating 6F is a reflection type diffraction grating. An incident surface of the laser beam $L_{on}$ and $L_{off}$ in the diffraction grating 6F is a diffraction grating surface on which a grating structure such as a blazed grating is formed. The traveling direction of the laser beam reflected from the diffraction grating 6F toward the plane mirror 41 (i.e., the incident angle $\theta_H$ with respect to the mirror surface 41a of the plane mirror 41) varies depending on the wavelength of the laser beam incident on the diffraction grating 6F. For example, when sweeping is performed between the wavelengths $\lambda_{on}$ and $\lambda_{off}$, the incident angle $\theta_H$ continuously changes between the incident angle $\theta_{on}$ of the laser beam $L_{on}$ of the wavelength $\lambda_{on}$, and the incident angle $\theta_{off}$ of the laser beam $L_{off}$ of the wavelength $\lambda_{off}$. Here, it is preferable that the incident angle $\theta_{on}$ and the incident angle $\theta_{off}$ are set so as to satisfy a condition of being a natural number multiple of the tilt angle $\alpha$, and the other angles (that is, angles between the incident angle $\theta_{on}$ and the incident angle $\theta_{off}$) are set so as not to satisfy the above condition. According to such a configuration, when the return light L2 is detected by the light detector 3 while sweeping the wavelengths between the wavelengths $\lambda_{on}$ and $\lambda_{off}$, the detection results corresponding to the wavelengths $\lambda_{on}$ and $\lambda_{off}$ can be easily observed. More specifically, since a signal corresponding to a laser beam having a wavelength other than the wavelength $\lambda_{on}$ and the wavelength $\lambda_{off}$ is not detected by the light detector 3 (even if it is detected, it is very small), two peak values corresponding to the wavelength $\lambda_{on}$ and the wavelength $\lambda_{off}$ can be observed. As a result, analysis based on the difference between the two peak values (differential absorption spectroscopy described later) can be easily performed.

The spectrometer 1F makes it possible to carry out measurements of gas concentrations by means of differential absorption spectroscopy (for example differential absorption lidar (DIAL)). For example, it is possible to accurately measure the concentration distribution of gas molecules to be measured introduced between the plane mirrors 41 and 42 by alternately switching and emitting laser beam $L_{on}$ and laser beam $L_{off}$ by sweeping between the wavelengths $\lambda_{on}$ and $\lambda_{off}$ as described above and analyzing the difference between the signals (peak signals detected by the light detector 3) (i.e., the difference between the absorption amount for the wavelengths $\lambda_{on}$ and $\lambda_{off}$). That is, by calibrating the measurement value corresponding to the wavelength $\lambda_{on}$ using the measurement value corresponding to the wavelength $\lambda_{off}$ as a reference value, fluctuation (noise) derived from the environment can be eliminated, and the concentration distribution of gas molecules can be performed with high accuracy. Examples of the above-described noise include blurring of the light source unit 2F, dirt on the surfaces (mirror surfaces 41a and 42a) of the plane mirrors 41 and 42, misalignment of an optical path from the light source unit 2F to the light detector 3, and influence of absorption by gas other than the gas to be measured. That is, since calibration using the measurement value corresponding to the wavelength $\lambda_{off}$ can be performed on the measurement value corresponding to the wavelength $\lambda_{on}$ at any time, it is possible to cancel noise due to the influence of the atmosphere of the measurement environment or the like and perform high-accuracy measurement. In addition, by using a diffraction grating 6F having a fixed angle instead of a movable member such as a movable diffraction grating 6H of a spectrometer 1H described later as the diffraction grating, a stable configuration having high mechanical strength can be realized.

In addition, since the DFB-QCL has a relatively narrow sweep width, the wavelength $\lambda_{on}$ and the wavelength $\lambda_{off}$ have relatively close values. For this reason, the difference between the incident angle $\theta_{on}$ and the incident angle $\theta_{off}$ becomes relatively small, and the deviation (difference) between the optical path length of the laser beam $L_{on}$ and the optical path length of the laser beam $L_{off}$ between the plane mirrors 41 and 42 becomes relatively small. Therefore, by performing wavelength-sweeping between the wavelengths $\lambda_{on}$ and $\lambda_{off}$ using the DFB-QCL as the light source unit 2F, it is possible to perform measurement by the above-described differential absorption spectrometry with high accuracy.

Seventh Embodiment

Figure 17:
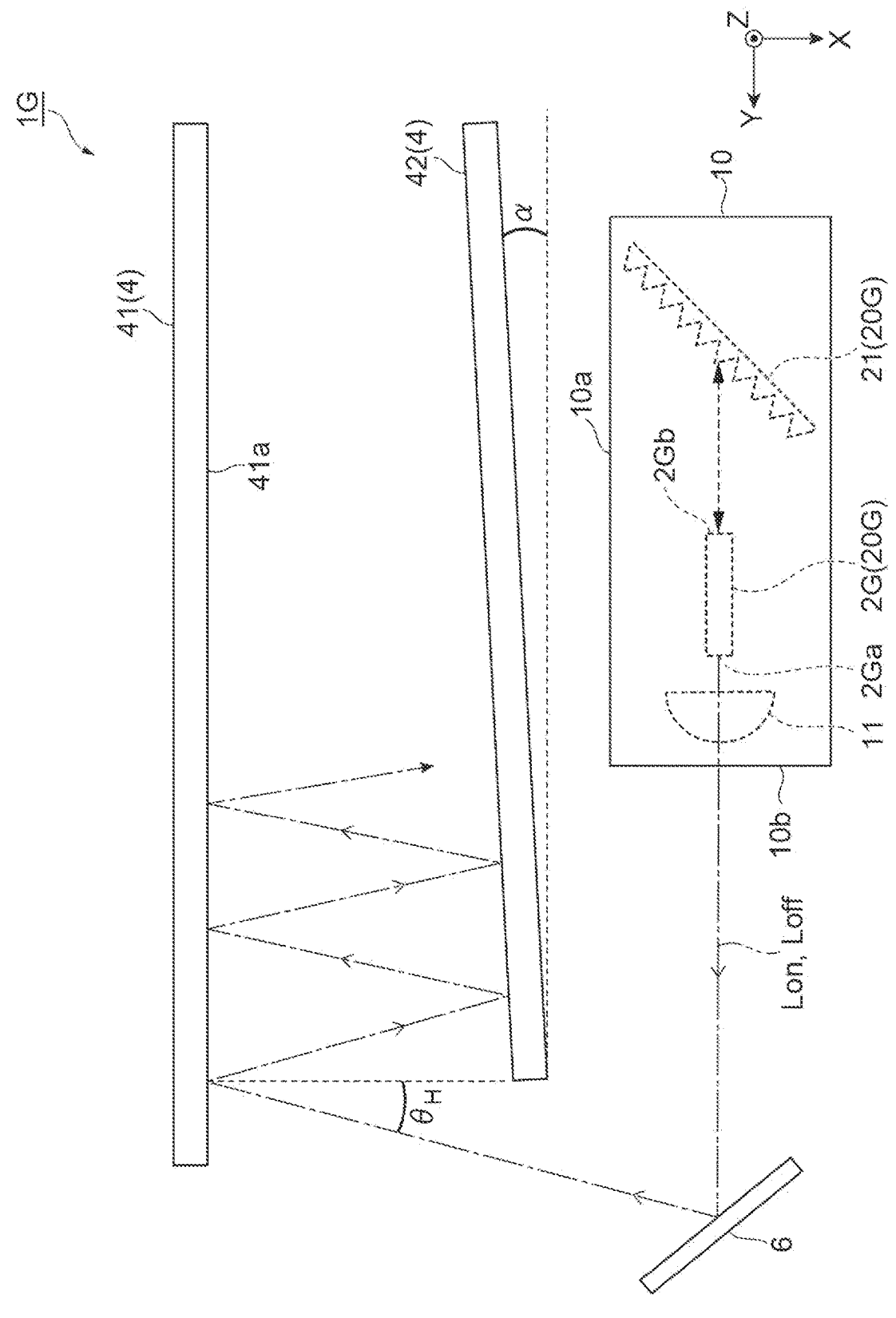
FIG. 17 is a plan view schematically showing the configuration of the spectrometer of a seventh embodiment.

A spectrometer 1G according to a sixth embodiment will be described with reference to FIG. 17. The spectrometer 1G is different from the spectrometer 1A in that the spectrometer 1G includes a light source unit 20G including a single quantum cascade laser 2G (hereinafter, referred to as a "QCL element 2G") and a diffraction grating 21. Similarly to the spectrometer 1F, the spectrometer 1G does not require a plurality of laser elements as a light source, and realizes a configuration in which the laser beam $L_{on}$ and a laser beam $L_{off}$ are switched and emitted by controlling wavelength of light emitted from a single laser element (QCL element 2G in the present embodiment).

Similarly to the light source unit 2F, the light source unit 20G is configured to be able to emit the laser beam $L_{on}$ of the wavelength $\lambda_{on}$ and the laser beam $L_{off}$ of the wavelength $\lambda_{off}$. The spectrometer 1F described above realizes a configuration in which the laser beam $L_{on}$ and $L_{off}$ can be switched by providing a wavelength-sweepable DFB-QCL with a QCL element alone as a light source unit 2F. On the other hand, the spectrometer 1G includes an external cavity quantum cascade laser (EC-QCL) configured by the QCL element 2G and the diffraction grating 21 as the light source unit 20G, thereby realizing a configuration capable of switching the laser beam $L_{on}$ and $L_{off}$.

The QCL element 2G has an end surface 2Ga facing the incident adjustment mirror 6 and an end surface 2Gb opposite to the end surface 2Ga. In addition, the diffraction grating 21 is accommodated in the housing 10 together with the QCL element 2G and is disposed at a position facing the end surface 2Gb. The diffraction grating 21 is a reflection-type diffraction grating similar to the diffraction grating 6F. That is, the surface of the diffraction grating 21 facing the end surface 2Gb is a diffraction grating surface on which a grating structure such as a blazed grating is formed.

The light emitted from the end surface 2Gb enters the diffraction grating 21, is diffracted and reflected, and returns to the end surface 2Gb. Thus, a Littrow type external resonator is formed between the end surface 2Ga of the QCL element 2G and the diffraction grating 21. By changing the angle (inclination) of the diffraction grating 21 with respect to the QCL element 2G, it is possible to change the wavelength of light returning from the diffraction grating 21 to the QCL element 2G. This makes it possible to change the wavelength of output light (i.e., light amplified by resonance) emitted from the end surface 2Ga to the incident adjustment mirror 6.

According to the spectrometer 1G, the same effect as that of the above-described spectrometer 1F is exhibited. In the spectrometer 1G, the incident adjustment mirror 6 is used instead of the diffraction grating 6F. Therefore, in the spectrometer 1G, there is no optical path length difference between the laser beam $L_{on}$ and $L_{off}$. That is, since the laser beam $L_{on}$ and $L_{off}$ are incident on the incident adjustment mirror 6 in the same direction and are reflected at the same angle, the incident angle $\theta_{on}$ of the laser beam $L_{on}$ coincides with the incident angle $\theta_{off}$ of the laser beam $L_{off}$. Therefore, in the spectrometer 1G, the optical path length of the laser beam $L_{on}$ between the plane mirrors 41 and 42 coincides with the optical path length of the laser beam $L_{off}$. Therefore, according to the spectrometer 1G, measurement by the differential absorption spectroscopy described above can be performed with higher accuracy than in the case of using a diffraction grating 6F such as the spectrometer 1F.

In the spectrometer 1F, the incident adjustment mirror 6 may be used instead of the diffraction grating 6F. In addition, in the spectrometer 1G, the diffraction grating 6F may be used instead of the incident adjustment mirror 6. As described above, when the diffraction grating 6F is used, there is an advantage that results (two peak values) corresponding to the wavelengths $\lambda_{on}$ and $\lambda_{off}$ can be observed by adjusting only the incident angles $\theta_{on}$ and $\theta_{off}$ to be natural number multiples of the tilt angle $\alpha$. On the other hand, when the incident adjustment mirror 6 is used, since the optical path lengths of the laser beam $L_{on}$ and $L_{off}$ can be made to coincide with each other, there is an advantage that the measurement by the differential absorption spectroscopy can be performed with higher accuracy. More specifically, when the incident adjustment mirror 6 is used in the spectrometer 1F using a continuously wavelength-sweeping DFB-QCL as a light source, there is a disadvantage that light of wavelengths other than the target two wavelengths $\lambda_{on}$ and $\lambda_{off}$ is also detected by the light detector 3. However, by using the diffraction grating 6F, such a disadvantage can be avoided and only two peak values can be observed. On the other hand, in the spectrometer 1G using the EC-QCL as the light source, since the two wavelengths $\lambda_{on}$ and $\lambda_{off}$ can be appropriately selected by the light source (EC-QCL), the disadvantage of using the incident adjustment mirror 6 in the spectrometer 1F as described above (that is, light having wavelengths other than the target two wavelengths $\lambda_{on}$ and $\lambda_{off}$ is also detected by the light detector 3) does not occur. That is, according to the spectrometer 1G, by using the EC-QCL, it is possible to obtain the above-described advantage (that is, improvement in measurement accuracy by matching the optical path lengths of the laser beam $L_{on}$ and $L_{off}$) while avoiding the above-described disadvantage by using the incident adjustment mirror 6.

Eighth Embodiment

Figure 18:
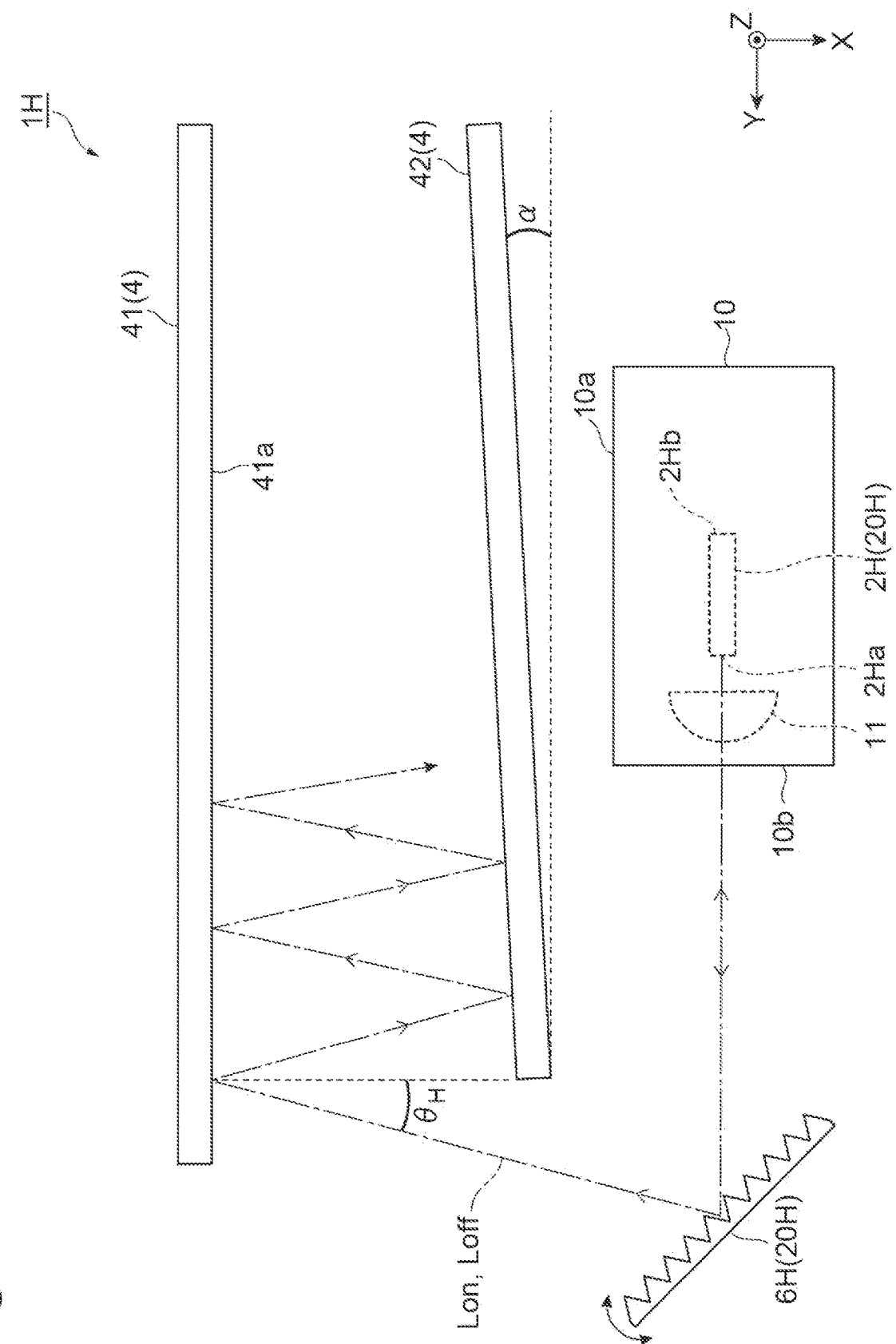
FIG. 18 is a plan view schematically showing the configuration of the spectrometer of an eighth embodiment.

A spectrometer 1H of an eighth embodiment will be described with reference to FIG. 18. The spectrometer 1H is different from the spectrometer 1A in that the spectrometer 1H includes a light source unit 20H configured by a single quantum cascade laser element 2H (hereinafter, referred to as a "QCL element 2H") and a movable diffraction grating 6H. The movable diffraction grating 6H constitutes an external resonator with the QCL element 2H, and has a role of guiding the laser beam emitted from the QCL element 2H to the mirror surface 41a of the plane mirror 41 (that is, a role of the incident adjustment mirror 6). That is, the spectrometer 1H is different from the spectrometer 1A in that the spectrometer 1H includes a movable diffraction grating 6H instead of the incident adjustment mirror 6.

Similarly to the light source unit 2F, the light source unit 20H is configured to be able to emit the laser beam $L_{on}$ of the wavelength $\lambda_{on}$ and the laser beam $L_{off}$ of the wavelength $\lambda_{off}$. Similarly to the spectrometer 1G, the spectrometer 1H includes an external cavity quantum cascade laser (EC-QCL) configured by the QCL element 2H and the movable diffraction grating 6H as the light source unit 20H, thereby realizing a configuration capable of switching the laser beam $L_{on}$ and $L_{off}$. However, while the spectrometer 1G includes the diffraction grating 21 separate from the incident adjustment mirror 6 inside the housing 10, the spectrometer 1H includes the movable diffraction grating 6H that also serves as the incident adjustment mirror 6 outside the housing 10 (i.e., at a position corresponding to the incident adjustment mirror 6).

The QCL element 2H has an end surface 2Ha facing the movable diffraction grating 6H and an end surface 2Hb opposite to the end surface 2Ha. In addition, the movable diffraction grating 6H is disposed at a position facing the end surface 2Ha (that is, a position corresponding to the incident adjustment mirror 6 in the spectrometer 1A). The movable diffraction grating 6H is a reflection type diffraction grating similar to the diffraction grating 21, but is different from the diffraction grating 21 in that the incident angle of the laser beam emitted from the end surface 2Ha with respect to the surface (diffraction grating surface) of the movable diffraction grating 6H is configured to be variable by rotating around the Z-axis.

Light emitted from the end surface 2Ha enters the movable diffraction grating 6H and returns to the end surface 2Ha by being diffracted and reflected. Thus, a Littrow type external resonator is formed between the end surface 2Hb of the QCL element 2H and the movable diffraction grating 6H. As described above, by changing the angle (inclination) of the movable diffraction grating 6H with respect to the QCL element 2H, the wavelength of light returning from the movable diffraction grating 6H to the QCL element 2H is changed. This makes it possible to change the wavelength of output light (that is, light amplified by resonance) emitted from the end surface 2Ha. Part of the light emitted from the end surface 2Ha and incident on the movable diffraction grating 6H is mirror-reflected by the surface of the movable diffraction grating 6H as 0th order light, and travels toward the mirror surface 41$a$ of the plane mirror 41. In the spectrometer 1H, such 0th order light corresponds to laser beam $L_{on}$ and $L_{off}$. In other words, the spectrometer 1H is configured to be able to perform measurement by differential absorption spectroscopy by using such 0th order light.

In the spectrometer 1H, the angle of the movable diffraction grating 6H changes in order to perform wavelength-sweeping. Therefore, in the spectrometer 1H, as in the spectrometer 1F, the incident angle $\theta_{on}$ of the laser beam $L_{on}$ is different from the incident angle $\theta_{off}$ of the laser beam $L_{off}$. Therefore, also in the spectrometer 1H, similarly to the spectrometer 1F, it is preferable that the incident angle $\theta_{on}$ and the incident angle $\theta_{off}$ are set so as to satisfy the condition that they are natural number multiples of the tilt angle $\alpha$, and the other angles (that is, angles between the incident angle $\theta_{on}$ and the incident angle $\theta_{off}$) are set so as not to satisfy the above condition. According to the above configuration, similarly to the spectrometer 1F, when the return light L2 is detected by the light detector 3 while sweeping the wavelengths between the wavelengths $\lambda_a$ and $\lambda_{off}$ two peak values corresponding to the wavelengths $\lambda_a$ and $\lambda_{off}$ can be observed.

According to the spectrometer 1H, the same effect as that of the above-described spectrometer 1F is exhibited. In addition, in the spectrometer 1H, since the movable diffraction grating 6H used instead of the incident adjustment mirror 6 can function as an external resonator with the QCL element 2H, the diffraction grating 21 in the spectrometer 1G becomes unnecessary. As a result, the number of components can be reduced and the size of the package (housing 10) can be reduced.

[Modification]

Although some embodiments and some modifications of the present disclosure have been described above, the present disclosure is not limited to the configurations shown in the above embodiments and modifications. The material and shape of each component are not limited to the specific material and shape described above, and various materials and shapes other than those described above may be employed. In addition, some configurations included in each embodiment and each modification example described above may be omitted or changed as appropriate, or may be arbitrarily combined. For example, the embodiments related to the formed optical path (first to third and sixth to eighth embodiments) and the embodiment related to the accommodation form of the spectrometer (fourth and fifth embodiment) can be combined. Further, the fourth embodiment and the fifth embodiment may be combined. That is, the mirror unit 4 may be accommodated in the housing 51 disposed in the housing 61.

Further, the positional relationship between the light source unit 2 and the light detector 3 may be reversed. That is, although the light source unit 2 is disposed above the light detector 3 in the above-described embodiment, the light detector 3 may be disposed above the light source unit 2. In this case, the positional relationship between the incident adjustment mirror 6 and the light guide mirror 7 is also reversed. Further, the direction of the incident angle $\theta_V$ is reversed, and the outward path OP1 is positioned above the return path OP2.

In addition, the incident adjustment mirror 6 and the light guide mirror 7 may be omitted. However, in this case, it is necessary to adjust the position and orientation of the light source unit 2 with high accuracy so that the laser beam L1 is incident on the position P1 at the incident angles $\theta_H$ and $\theta_V$. Similarly, it is necessary to accurately adjust the position and orientation of the light detector 3 so that the return light L2 reflected by the position P2 enters the light detection surface 3$a$. By using the incident adjustment mirror 6 and the light guide mirror 7, the directions of the light source unit 2 and the light detector 3 may be simply arranged parallel to the Y-axis direction as in the present embodiment. In addition, the light source unit 2 and the light detector 3 (in the present embodiment, the housing 10 that houses them) can be compactly disposed on the side of the mirror unit 4.

Further, the light source unit 2 is not limited to the quantum cascade laser element, and the light detector 3 is not limited to the quantum cascade photodetector. Also, the laser beam L1 emitted from the light source unit 2 is not limited to mid-infrared light. For example, the waveband of the laser beam L1 may be a visible light region. In addition, when the spread angle of the laser beam L1 emitted from the light source unit 2 is relatively small, the lenses 11 and 12 may be omitted.

In addition, the incident angle $\theta_H$ does not necessarily need to satisfy Expression (3). For example, as described in the above-described embodiment, since the laser beam L1, which is mid-infrared light, has wavelengths longer than those of visible light and near-infrared light, the beam diameter of the laser beam L1 is likely to spread with long-distance propagation of the laser beam L1 using multiple reflection between the plane mirrors 41 and 42. Therefore, if the position P2 of the return is too close to the back end portion 41$h$, a part of the laser beam L1 in which the beam diameter is increased protrudes rearward from the back end portion 41$h$, and a loss of the laser beam L1 may occur. In order to suppress such loss of the laser beam L1, the incident angle $\theta_H$ may be intentionally set to an angle smaller than the angle satisfying the above Expression (3).

The incident angle $\theta_H$ does not necessarily have to be set to a natural number multiple of the tilt angle $\alpha$. That is, the outward path OP1 and the return path OP2 do not necessarily completely match (overlap) each other when viewed from the Z-axis direction. In this case, when viewed from the Z-axis direction, the optical path of the return light L2 does not coincide with the optical path of the laser beam L1 before return, but even in such a case, the return light L2 can be guided to the light detector 3 by adjusting the position and angle of the light guide mirror 7, for example. However, by designing so that the outward path OP1 and the return path OP2 overlap with each other in the Z-axis direction, there is an advantage that it becomes easy to perform the arrangement design of the optical system (the incident adjustment mirror 6, the light guide mirror 7, and the like) and to arrange the incident adjustment mirror 6 and the light guide mirror 7 compactly by overlapping them in the Z-axis direction as in the above embodiment.

The optical system included in the spectrometer is not limited to that described in the above embodiment. For example, a collimating lens for suppressing the beam spread of the laser beam L1 may be disposed at an arbitrary position on the optical path except between the plane mirrors 41 and 42 of the laser beam L1.

In addition, in the second embodiment and the third embodiment, the wavelengths (the first wavelength and the second wavelength) of the laser beam L1A and L1B emitted by the light source units 2A and 2B may be set to the wavelengths $\lambda_{on}$ and $\lambda_{off}$ in the sixth to eighth embodiments. In this case, in the second embodiment and the third embodiment, based on the difference between the signal detected by the light detector 3A and the signal detected by the light detector 3B, the gas concentration can be measured by differential absorption spectroscopy as described in the sixth to eighth embodiments.

In addition, in each embodiment and each modification example described above, the gas introduced between the two plane mirrors 41 and 42 is set as the measurement target, but the measurement target is not limited to the gas. The measurement target may be disposed on the optical path of the laser beam between the two plane mirrors 41 and 42, and may be a solid or a liquid (for example, a liquid stored in a container that transmits light).

Figure 19:
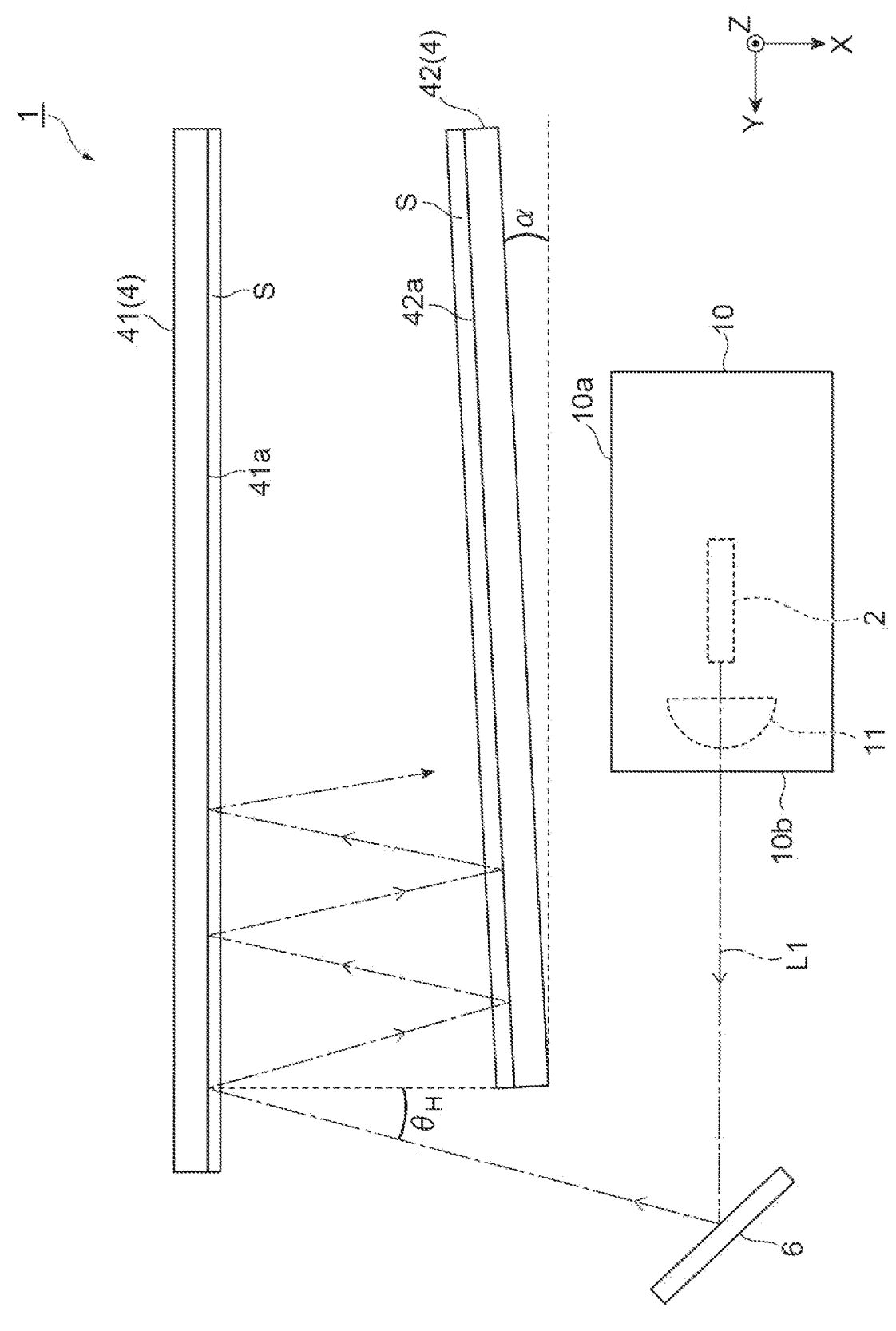
FIG. 19 is a diagram showing a configuration example of a spectrometer in a case where light measurement for a solid measurement target is performed.

FIG. 19 is a diagram illustrating a configuration example of the spectrometer 1A in a case where a solid sample S is used as a measurement target. In the example of FIG. 19, the sample S is a thin film-like material and is fixed on the mirror surfaces 41a and 42a of the plane mirrors 41 and 42. As illustrated in FIG. 19, by arranging the sample S so as to have a predetermined width along the direction (Y-axis direction) in which the laser beam reciprocates while being multiply reflected between the plane mirrors 41 and 42, it is possible to secure a distance in which the laser beam passes through the sample S. The sample S may be provided on only one of the mirror surfaces 41a and 42a. However, when the sample S is disposed on both of the mirror surfaces 41a and 42a, it is possible to more suitably secure a distance in which the laser beam passes through the sample S. In addition, the sample S may not necessarily be fixed to the mirror surfaces 41a and 42a. For example, a light transmissive member that transmits the laser beam may be disposed between the plane mirrors 41 and 42, and the sample S may be fixed to the surface of the light transmissive member. However, by using the mirror surfaces 41a and 42a as members for fixing the sample S as in the example of FIG. 19, the light transmissive member can be omitted, so that simplification of the device configuration and reduction in the number of components required for measurement can be achieved.

In addition, in each embodiment and each modification example described above, the light measuring device (spectrometer 1A to 1H) configured to perform absorption spectroscopy for a plurality of wavelengths has been described, but the light measuring device of the present disclosure may be used for single-wavelength measurement (for example, absorbance measurement for specific wavelength). For example, there may be a need to grasp the transmittance of a certain material with respect to terahertz waves (for example, light having wavelengths included in the range of 0.1 THz to 0.3 THz). In such a case, the light source unit may be configured as a wavelength-fixed light source that emits light of a specific single wavelength included in the terahertz region.

What is claimed is:

1. A light measuring device comprising:
   a light source unit configured to emit a laser beam;

a mirror unit including a first plane mirror having a first mirror surface on which the laser beam emitted from the light source unit is incident and a second plane mirror having a second mirror surface opposite to the first mirror surface, wherein a measurement target is introduced between the first mirror surface and the second mirror surface;

a light detector configured to detect the laser beam returned by multiple reflection between the first mirror surface and the second mirror surface; and wherein the first mirror surface and the second mirror surface are arranged non-parallel to each other when viewed from a third direction orthogonal to a first direction orthogonal to the first mirror surface and a second direction orthogonal to the first direction so as to form an optical path of the laser beam reciprocating in the second direction while performing multiple reflection between the first mirror surface and the second mirror surface, an optical path of the laser beam between the first mirror surface and the second mirror surface is inclined with respect to the third direction, and a tilt angle of the second mirror surface with respect to the first mirror surface when viewed from the third direction is set to be larger than a spread angle of the laser beam passing between the first mirror surface and the second mirror surface when viewed from the third direction.

2. The light measuring device according to claim 1, wherein
   the optical path of the laser beam initially incident on the first mirror surface is inclined with respect to the third direction; and
   the first mirror surface and the second mirror surface are parallel to the third direction.

3. The light measuring device according to claim 1, wherein
   an incident angle of the laser beam first incident on the first mirror surface when viewed from the third direction with respect to the first mirror surface is adjusted to be a natural number multiple of a tilt angle of the second mirror surface with respect to the first mirror surface when viewed from the third direction.

4. The light measuring device according to claim 1, wherein
   a distance along the second direction from a position where the laser beam is first incident on the first mirror surface to an end portion of the first mirror surface in an outward direction of the laser beam is equal to or less than 300 mm.

5. The light measuring device according to claim 1, wherein
   a length of the mirror unit in the third direction is equal to or less than 50 mm.

6. The light measuring device according to claim 1, wherein
   an end portion of the first mirror surface in a return direction of the laser beam protrudes in the return direction more than an end portion of the second mirror surface in the return direction.

7. The light measuring device according to claim 6, wherein
   when an incident angle of the laser beam first incident on the first mirror surface when viewed from the third direction with respect to the first mirror surface is represented by $\theta_H$, a distance along the second direction from the end portion of the second mirror surface in the return direction of the laser beam to the end portion of the first mirror surface in the return direction is set to be equal to or greater than a value obtained by multiplying tan $\theta_H$ by a distance between the first mirror surface and the end portion of the second mirror surface along the first direction.

8. The light measuring device according to claim 7, wherein a distance along the second direction from the end portion of the second mirror surface in the return direction to the end portion of the first mirror surface in the return direction is set to a value obtained by multiplying tan $\theta_H$ by a distance between the first mirror surface and the end portion of the second mirror surface along the first direction.

9. The light measuring device according to claim 1, wherein the light source unit and the light detector are arranged to overlap with each other in the third direction.

10. The light measuring device according to claim 1, further comprising a lens disposed on a side of the light source unit from which the laser beam is emitted and configured to condense or collimate the laser beam, wherein the light source unit is a quantum cascade laser element, and a distance between the lens and the quantum cascade laser element is shorter than the shortest distance between the first mirror surface and the second mirror surface in the first direction.

11. The light measuring device according to claim 1, wherein the light source unit is a quantum cascade laser element, and the light detector is a quantum cascade photodetector having a characteristic corresponding to that of the quantum cascade laser element.

12. The light measuring device according to claim 11, wherein the characteristic is a characteristic related to a polarization direction, and the light source unit and the light detector are arranged such that a polarization direction of the laser beam emitted from the light source unit and then incident on the light detector via the mirror unit coincides with a polarization direction to which the light detector is sensitive.

13. The light measuring device according to claim 11, wherein the characteristic is a characteristic related to a wavelength, and the light detector has a sensitive wavelength corresponding to an oscillation wavelength of the light source unit.

14. The light measuring device according to claim 1, further comprising:

a first guide mirror configured to reflect the laser beam emitted from the light source unit to guide the laser beam to the first mirror surface; and a second guide mirror configured to guide the laser beam to the light detector by reflecting the returned laser beam, wherein the first guide mirror and the second guide mirror are disposed so as to overlap with each other in the third direction.

15. The light measuring device according to claim 1, wherein the light source unit includes:

a first light source unit configured to emit the laser beam having a first wavelength; and a second light source unit configured to emit the laser beam having a second wavelength different from the first wavelength, the light detector includes:

a first light detector configured to detect the laser beam of the first wavelength reflected and returned by multiple reflection between the first mirror surface and the second mirror surface; and a second light detector configured to detect the laser beam of the second wavelength reflected and returned by multiple reflection between the first mirror surface and the second mirror surface, and the first light source unit, the second light source unit, the first light detector, and the second light detector are arranged to overlap with each other in the third direction.

16. The light measuring device according to claim 1, wherein the light source unit includes:

a first light source unit configured to emit the laser beam having a first wavelength; and a second light source unit configured to emit the laser beam having a second wavelength different from the first wavelength, the light detector includes:

a first light detector configured to detect the laser beam of the first wavelength reflected and returned by multiple reflection between the first mirror surface and the second mirror surface; and a second light detector configured to detect the laser beam of the second wavelength reflected and returned by multiple reflection between the first mirror surface and the second mirror surface, and the first light source unit and the second light source unit are arranged side by side in the first direction, the first light detector and the second light detector are arranged side by side in the first direction, the first light source unit and the first light detector are disposed so as to overlap with each other in the third direction, and the second light source unit and the second light detector are disposed so as to overlap with each other in the third direction.

17. The light measuring device according to claim 1, further comprising a housing configured to hermetically accommodate the mirror unit, wherein the measurement target is a gas, the housing is provided with an opening for introducing the gas from an outside of the housing to an inside of the housing, and the light source unit and the light detector are disposed outside the housing.

18. The light measuring device according to claim 1, further comprising a housing configured to accommodate the light source unit, the light detector, and the mirror unit, wherein the measurement target is a gas, and the housing is provided with an opening for introducing the gas from an outside of the housing to an inside of the housing.

19. The light measuring device according to claim 1, wherein the measurement target is a gas, and the light source unit is configured to be capable of emitting the laser beam having a first wavelength that is absorbed by the gas and the laser beam having a second wavelength that is less absorbed by the gas than the first wavelength.

20. The light measuring device according to claim 19, wherein the light source unit is configured to be able to emit the laser beam while switching between the laser beam of the first wavelength and the laser beam of the second wavelength based on light emitted from a single laser element.

21. A method of manufacturing the light measuring device according to claim 1, wherein the light measuring device further comprises:

a first guide mirror configured to reflect the laser beam emitted from the light source unit to guide the laser beam to the first mirror surface; and a second guide mirror configured to guide the laser beam to the light detector by reflecting the returned laser beam, the method includes:

a step of fixing each of the light source unit, the light detector, the mirror unit, and the second guide mirror; and a step of adjusting and fixing a position and an angle of the first guide mirror after the step of fixing so that a light detection intensity in the light detector is maximized while emitting the laser beam from the light source unit.

\*    \*    \*    \*    \*